US011929581B2

(12) United States Patent
Rafferty et al.

(10) Patent No.: US 11,929,581 B2
(45) Date of Patent: *Mar. 12, 2024

(54) MOUNTING ASSEMBLIES FOR INSTALLATION OF POWER MODULES

(71) Applicant: EMOOV, LLC, Sanford, NC (US)

(72) Inventors: Debra Rafferty, Sanford, NC (US); Frank Vale, Sanford, NC (US)

(73) Assignee: EMOOV, LLC

( * ) Notice: Subject to any disclaimer, the term of this patent is extended or adjusted under 35 U.S.C. 154(b) by 0 days.

This patent is subject to a terminal disclaimer.

(21) Appl. No.: 17/818,567

(22) Filed: Aug. 9, 2022

(65) Prior Publication Data

US 2022/0385012 A1 Dec. 1, 2022

Related U.S. Application Data

(63) Continuation of application No. 17/153,677, filed on Jan. 20, 2021, now Pat. No. 11,469,559, which is a continuation-in-part of application No. PCT/US2019/042529, filed on Jul. 19, 2019.

(60) Provisional application No. 62/752,765, filed on Oct. 30, 2018, provisional application No. 62/701,207, filed on Jul. 20, 2018.

(51) Int. Cl.

| | |
|---|---|
| ***H01R 25/14*** | (2006.01) |
| ***H01R 13/625*** | (2006.01) |
| ***H01R 13/73*** | (2006.01) |

(52) U.S. Cl.

CPC ......... *H01R 25/142* (2013.01); *H01R 13/625* (2013.01); *H01R 13/73* (2013.01); *H01R 25/145* (2013.01)

(58) Field of Classification Search

CPC .... H01R 25/14; H01R 25/142; H01R 25/145; H01R 25/16; H01R 13/514; H01R 13/518; H02G 3/383

See application file for complete search history.

(56) References Cited

U.S. PATENT DOCUMENTS

| | | | |
|---|---|---|---|
| 3,894,781 | A | 7/1975 | Donato |
| 4,037,900 | A | 7/1977 | Schmidger |
| 4,747,025 | A | 5/1988 | Barton |
| 5,052,937 | A | 10/1991 | Glen |
| 5,762,525 | A | 6/1998 | Candeloro |
| 6,056,561 | A | 5/2000 | Lin |
| 6,059,582 | A | 5/2000 | Tsai |
| 6,439,749 | B1 | 8/2002 | Miller et al. |
| 6,527,565 | B1 | 3/2003 | Johns |
| 6,884,095 | B1 | 4/2005 | Tsai |

(Continued)

OTHER PUBLICATIONS

International Search Report and Written Opinion of corresponding PCT Application No. PCT/US2019/042529, dated Nov. 6, 2019.

*Primary Examiner* — Anessa Girardi

(74) *Attorney, Agent, or Firm* — Renner, Otto, Boisselle & Sklar, LLP

(57) ABSTRACT

A mounting assembly for mechanical and electrical engagement of a power module includes a stem having a base operably coupled to the power module and a distal end distal the base, a first electrode arm extending perpendicularly from a first side of the and having formed thereon a first electrode disposed on the first electrode arm to form a first incline surface, and a first locking arm extending perpendicularly from the first side of the and having formed thereon a first locking surface. A plane of the first incline surface intersects a plane of the first locking surface.

18 Claims, 28 Drawing Sheets

(56) References Cited

U.S. PATENT DOCUMENTS

| | | | |
|---|---|---|---|
| 7,094,077 | B1 | 8/2006 | Chen |
| 7,111,957 | B2 | 9/2006 | Bernhart et al. |
| 8,755,305 | B2 | 6/2014 | Altekar et al. |
| 8,851,717 | B2 | 10/2014 | Verbrugh |
| 8,968,011 | B2 | 3/2015 | Hoffmeister |
| 9,039,230 | B2 | 5/2015 | Crimi et al. |
| 9,121,597 | B2 | 9/2015 | Snagel et al. |
| 9,136,659 | B2 | 9/2015 | Fishman et al. |
| 9,564,747 | B2 | 2/2017 | Ross et al. |
| 9,673,582 | B2 | 6/2017 | Guilmette |
| 9,835,320 | B2 | 12/2017 | Zhang et al. |
| 9,927,081 | B2 | 3/2018 | Bergman et al. |
| 2014/0198490 | A1 | 7/2014 | Halseth |
| 2018/0066830 | A1 | 3/2018 | Tuchler |

MOUNTING ASSEMBLIES FOR INSTALLATION OF POWER MODULES

This application is a continuation of U.S. patent application Ser. No. 17/153,677 filed Jan. 20, 2021, which is a continuation in part of International Application No. PCT/US2019/042529 filed Jul. 19, 2019, which claims priority to U.S. Provisional Applications Nos. 62/752,765 filed on Oct. 30, 2018 and 62/701,207 filed on Jul. 20, 2018, the entire disclosures of which are hereby incorporated by reference.

BACKGROUND

Track lighting systems provide significant flexibility when designing a space's illumination. Track lighting allows for selectably positioning light modules such as light fixtures, pendants, etc. and for precisely directing illumination from the light modules to the space. This flexibility allows for adjustment according to the particular needs of the space to be illuminated.

A typical track lighting system comprises a track and lighting modules. Tracks support power distribution to and mechanical installation of the lighting modules anywhere along the track.

Even after installation, track lighting systems allow flexibility in making changes according to changes in lighting requirements. For example, light modules may be moveable along the track and/or re-orientable relative to the track. In some track lighting systems, lighting modules may be removed, added, and/or exchanged from the track according to need.

The visual impact of the lighting system overall comprises the light itself, but also the appearance of the track, the lighting modules, and their integration with their surroundings when mounted to a ceiling, wall, and/or other support member. Conventional track lighting systems are installed on the surface of the ceiling, wall, etc., which may distract from or negatively affect the esthetics of a space.

Moreover, conventional track lighting systems may involve locking mechanisms between track and lighting module that require extensive manipulation by a user, tools, and/or are just not convenient to install, remove, or adjust. Conventional track lighting locking mechanisms may also make the track lighting overly costly.

Therefore, there is a need in the field for improvements to the conventional track lighting system to make it more convenient, widely available, and cost-effective.

SUMMARY OF THE INVENTION

The present disclosure provides systems including mounting assemblies and tracks for installation of power modules. Tracks or assemblies may be installed flush with a ceiling or wall to minimize distraction and/or negative effect on the esthetics of the space. Moreover, the locking mechanisms disclosed herein to secure the power modules to the tracks or assemblies require no tools and only minimum manipulation by a user and are, thus, convenient to install, remove, or adjust. In addition, the systems disclosed herein provide safe and secure mechanical and electrical connection between the power modules and the tracks or assemblies while keeping the systems convenient and cost-effective.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Ceiling Track System

Figure 1A:
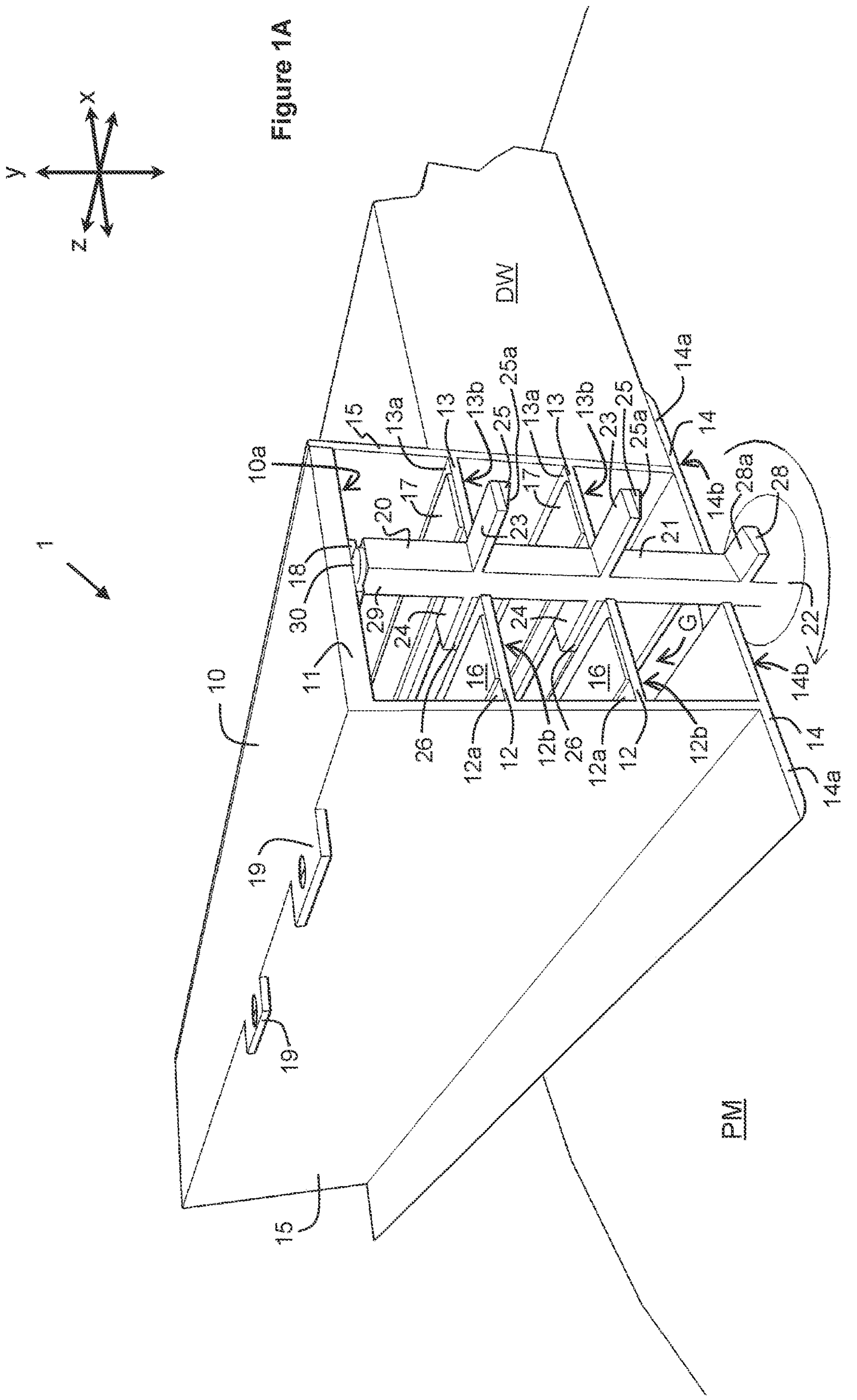
FIGS. 1A and 1B illustrate perspective views of an exemplary system including a track and a mounting assembly in the unlocked position and locked position, respectively.
Figure 1B:
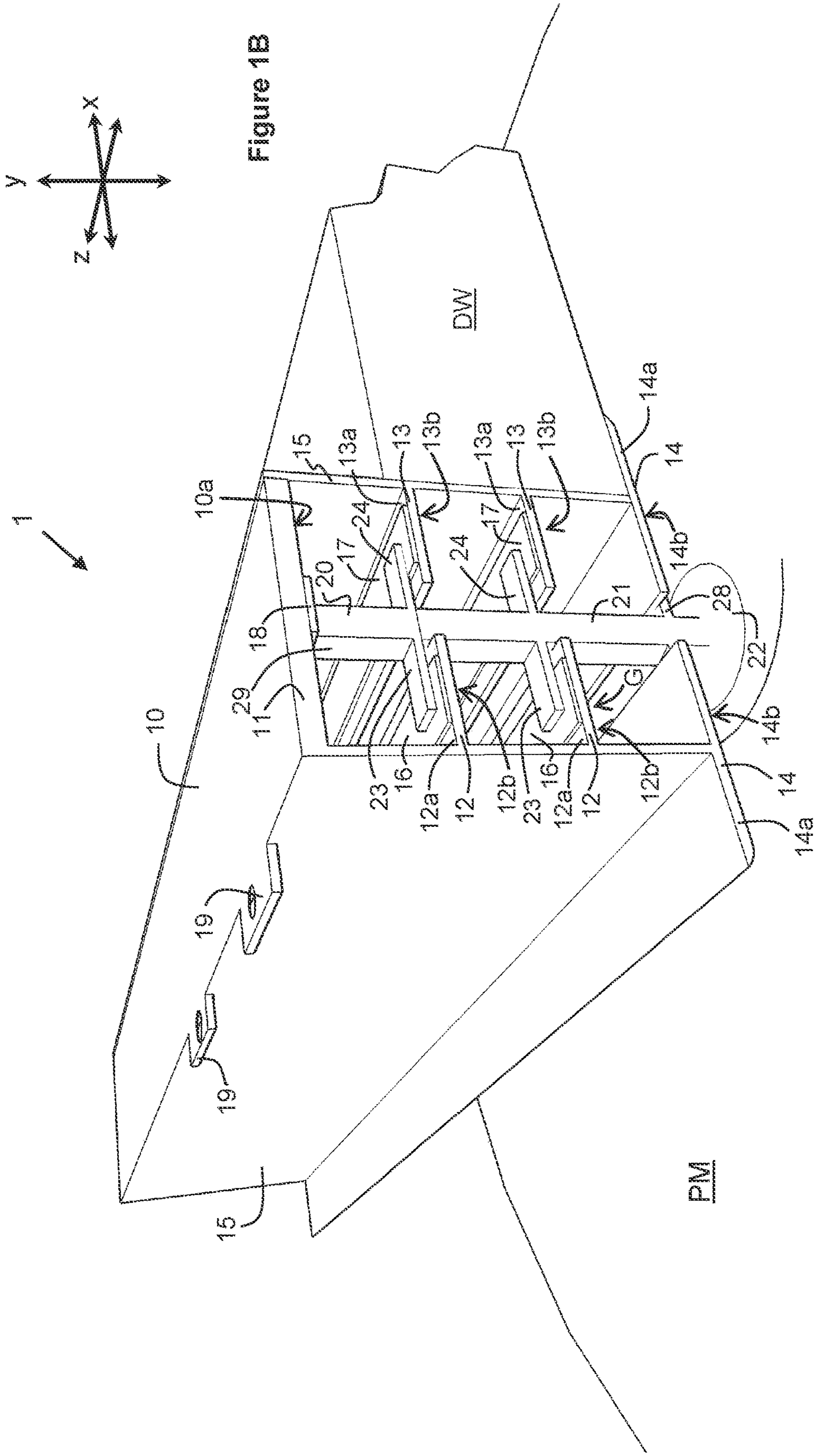

FIGS. 1A and 1B illustrate perspective views of a system 1 for mechanical and electrical engagement of a powered module PM to a ceiling DW. The powered module PM may be any module that receives power (AC or DC) to operate such as, for example, a light fixture, a speaker, a wi-fi router or repeater, a smoke detector, etc. As described below, the system 1 provides convenient installation of the powered module PM to the ceiling DW. FIG. 1A illustrates the system 1 in the inserting position while FIG. 1B illustrates the system 1 in the locked or connected position. The system 1 includes a track 10 and a mounting assembly 20.

Track

The track 10 may include a rail 11 (hereby described as upper rail 11 but that can also be a back rail 11 in wall-mounted track embodiments), electrode rails 12, 13, and locking rails 14. The track 10 may also include side walls 15 connecting the upper rail 11, the electrode rails 12,13, and the locking rails 14. In the example of FIGS. 1A and 1B, the track 10 includes two sets of electrode rails 12, 13. In other embodiments (not shown), the track 10 may include one set of electrode rails 12, 13 or more than two sets of electrode rails 12, 13.

The electrode rails 12, 13 may have electrodes 16, 17 coupled or formed thereon. The electrodes 16, 17 are elongated conductors (e.g., copper, aluminum, etc.) that extend most of the length of the corresponding rail. For example, a first electrode rail 12 may have coupled or formed thereon a positive electrode 16 extending most of the length of the rail 12 while a second electrode rail 13 may have coupled or formed thereon a negative electrode 17 extending most of the length of the rail 13. In the example of FIGS. 1A and 1B, each of the electrode rails 12, 13 has one electrode 16, 17 coupled or formed thereon. In other embodiments (not shown), each of the electrode rails 12, 13 may include more than one electrode 16, 17 coupled or formed thereon.

In the example of FIGS. 1A and 1B, the first electrode rails 12 have coupled or formed thereon electrodes 16 on a top surface 12*a* of the rails 12. Similarly, in the example of FIGS. 1A and 1B, the second electrode rails 13 have coupled or formed thereon electrodes 17 on a top surface 13*a* of the rails 13. In other embodiments (not shown), the first electrode rails 12 may have coupled or formed thereon electrodes 16 on a bottom surface 12*b* of the rails 12 or on both the top surface 12*a* and bottom surface 12*b*. Similarly, the second electrode rails 13 may have coupled or formed thereon electrodes 17 on a bottom surface 13*b* of the rails 13 or on both the top surface 13*a* and bottom surface 13*b*.

The track may also include a ground conductor 18 disposed on a bottom surface 11*a* of the upper rail 11. Like the electrodes 16, 17, the ground conductor 18 may be an elongated conductor (e.g., copper, aluminum, etc.) that extends most of the length of the upper rail 11. The ground conductor 18 may be installed or formed near the center of the bottom surface 11*a* of the upper rail 11.

The electrodes 16, 17, and the ground conductor 18 may be connected to a circuit such as, for example, a power circuit that may include a switch or dimmer to operate or control a powered module to be installed to the track 10. The electrodes 16, 17 may also correspond to, for example, positive and negative signals of an audio stereo output, etc.

The track 10 may also include mounting brackets 19 to attach the track 10 to, for example, a ceiling joist or other ceiling structure using bolts or another type of fastener. The locking rails 14 may extend outwardly from the walls 15 into flanges 14*a*. The track 10 may be installed substantially flush with a ceiling surface. The main body of the track 10 (including the upper rail 11, electrode rails 12, 13, and the side walls 15) may be inserted in a channel formed on the ceiling and the flanges 14*a* may overlap a portion of, for example, a drywall board DW which forms part of the ceiling.

In-Junction-Box System

Figure 2A:
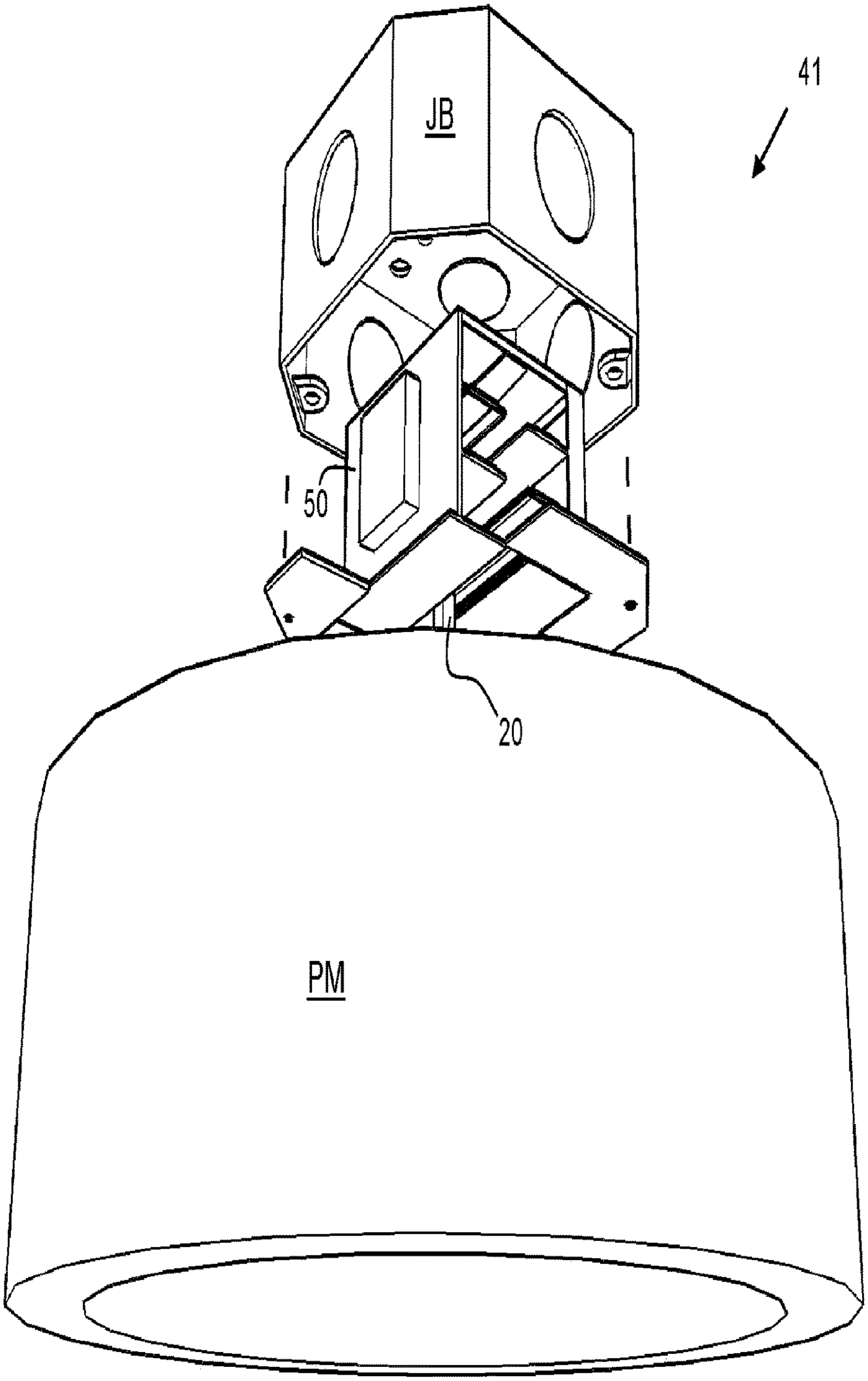
FIGS. 2A, 2B, and 2C illustrate perspective views of an exemplary in-junction-box system.
Figure 2B:
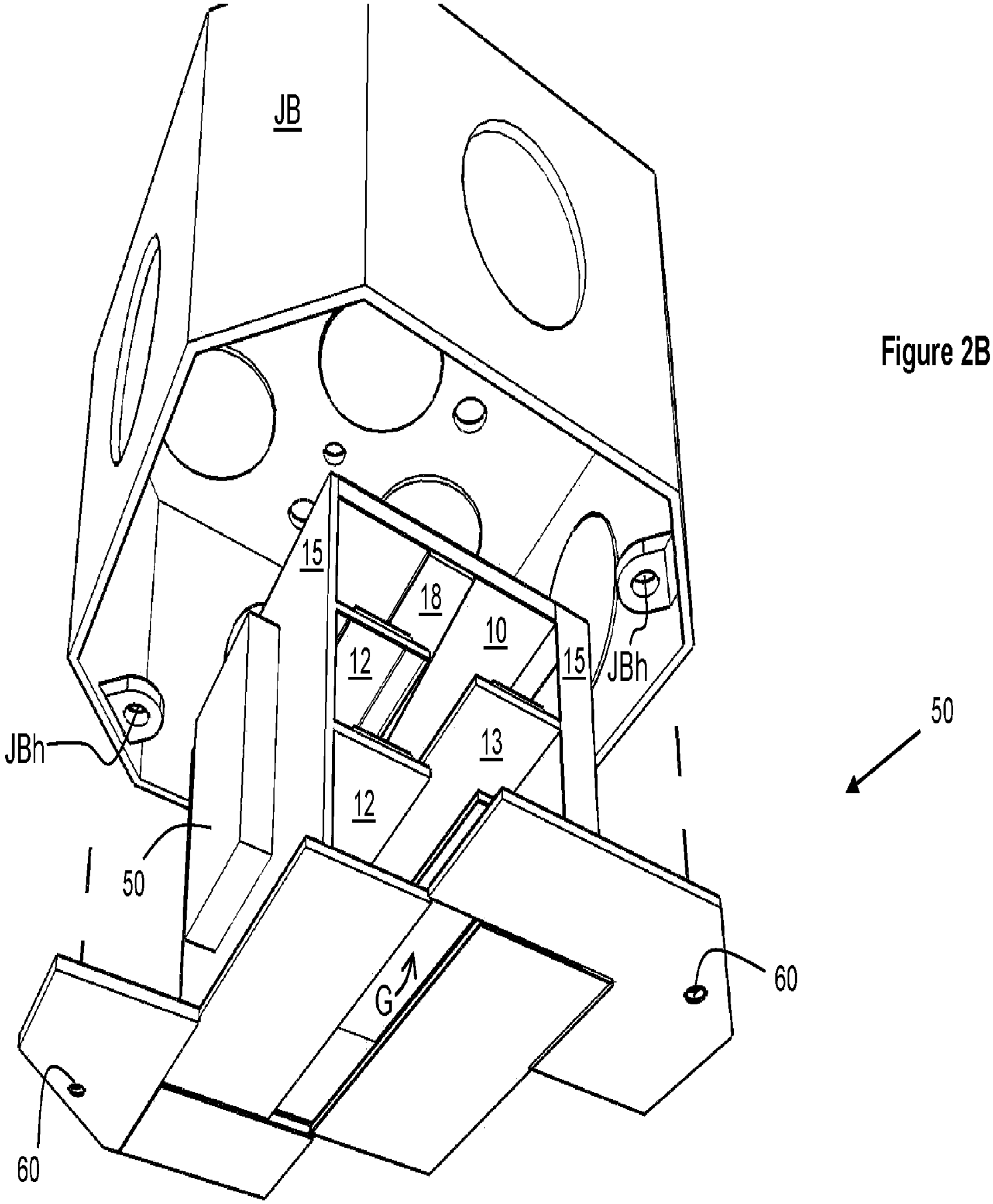
Figure 2C:
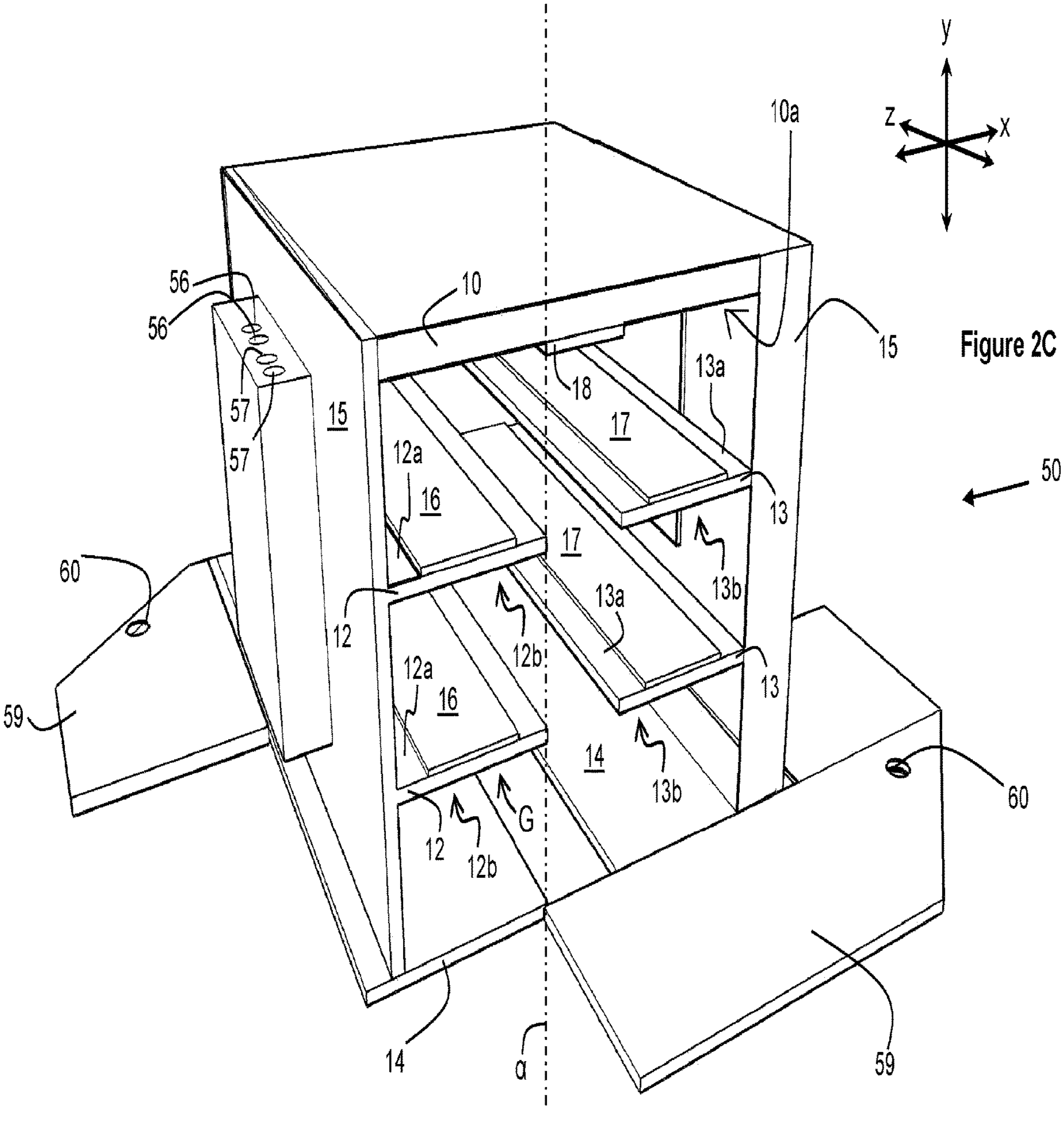

FIGS. 2A-2C illustrate views of an exemplary system 41 for mechanical and electrical engagement of a powered module PM to a junction box JB. As described above, the powered module PM may be any module that receives power (AC or DC) to operate such as, for example, a light fixture, a speaker, a wi-fi router or repeater, a smoke detector, etc. As described below, the system 41 provides convenient installation of the powered module PM to the junction box JB. For illustrative purposes, FIGS. 2A and 2B illustrate the system 41 uninstalled or exploded away from the junction box JB. The system 41 includes an in-junction-box assembly 50 and the mounting assembly 20.

In-Junction-Box Assembly

FIG. 2C illustrates a perspective view of an exemplary in-junction-box assembly 50. The in-junction-box assembly 50 may include an upper rail 11, electrode rails 12, 13, and locking rails 14. The in-junction-box assembly 50 may also include side walls 15 connecting the upper rail 11, the electrode rails 12,13, and the locking rails 14. In the example of FIG. 2C, the in-junction-box assembly 50 includes two sets of electrode rails 12, 13. In other embodiments (not shown), the in-junction-box assembly 50 may include one set of electrode rails 12, 13 or more than two sets of electrode rails 12, 13.

The electrode rails 12, 13 may have electrodes 16, 17 coupled or formed thereon. The electrodes 16, 17 are conductors (e.g., copper, aluminum, etc.) disposed on the corresponding rail. For example, a first electrode rail 12 may have coupled or formed thereon a positive electrode 16 while a second electrode rail 13 may have coupled or formed thereon a negative electrode 17. In the example of FIG. 2C, each of the electrode rails 12, 13 has one electrode 16, 17 coupled or formed thereon. In other embodiments (not shown), each of the electrode rails 12, 13 may include more than one electrode 16, 17 coupled or formed thereon.

In the example of FIG. 2C, the first electrode rails 12 have coupled or formed thereon electrodes 16 on a top surface 12*a* of the rails 12. Similarly, in the example of FIG. 2C, the second electrode rails 13 have coupled or formed thereon electrodes 17 on a top surface 13*a* of the rails 13. In other embodiments (not shown), the first electrode rails 12 may have coupled or formed thereon electrodes 16 on a bottom surface 12*b* of the rails 12 or on both the top surface 12*a* and bottom surface 12*b*. Similarly, the second electrode rails 13 may have coupled or formed thereon electrodes 17 on a bottom surface 13*b* of the rails 13 or on both the top surface 13*a* and bottom surface 13*b*.

The in-junction-box assembly 50 may also include a ground conductor 18 disposed on a bottom surface 11*a* of the upper rail 11. Like the electrodes 16, 17, the ground conductor 18 may be a conductor (e.g., copper, aluminum, etc.) disposed on the upper rail 11. The ground conductor 18 may be installed or formed near the center of the bottom surface 11*a* of the upper rail 11.

The electrodes 16, 17, and the ground conductor 18 may be connected to a circuit such as, for example, a power circuit that may include a switch or dimmer to operate or control a powered module to be installed to the in-junction-box assembly 50. The electrodes 16, 17 may also correspond to, for example, positive and negative signals of an audio stereo output, etc. In the example of FIG. 2C, the in-junction-box assembly 50 includes electrical terminals 56 and 57 for receiving electrical wire. The electrical terminals 56 and 57 may be operably connected to the electrodes 16 and 17, respectively. In one embodiment, the in-junction-box assembly 50 includes one or more ground terminals for receiving electrical wire. The one or more ground terminals may be operably connected to the ground conductor 18.

The in-junction-box assembly 50 may also include mounting brackets 59 to attach the in-junction-box assembly 50 to the junction box JB. In the illustrated embodiment, the mounting brackets 59 are flanges that extend radially away from a center axis $\alpha$ of the in-junction-box assembly 50. The mounting brackets 59 may have formed thereon mounting holes 60 to mount the in-junction-box assembly 50 to the junction box JB. using screws, bolts or another type of fastener. In one embodiment, the locking rails 14 may extend outwardly from the walls 15 into the flanges that form the mounting brackets 59.

As shown in FIG. 2B, the main body of the in-junction-box assembly 50 (including the upper rail 11, electrode rails 12, 13, and the side walls 15) may be inserted in the junction box JB and the mounting holes 60 may align with mounting holes JBh of the junction box JB. Once the in-junction-box assembly 50 is inserted in the junction box JB, the assembly 50 may be secured to the junction box JB using screws, bolts or another type of fastener inserted through the mounting holes 60 and screwed to the holes JBh of the junction box JB. Electrical connections may be made using the electrical terminals 56 and 57.

Mounting Assembly

FIGS. 3-7, in addition to FIGS. 1A-2B, illustrate the mounting assembly 20. The mounting assembly 20 may be attached to or form part of a powered module PM. The mounting assembly 20 provides mechanical and electrical engagement of the powered module PM to the track 10 or in-junction-box assembly 50 and, thus, to the ceiling. The mounting assembly 20 may include a column or stem 21 and a base 22 operably coupled to the powered module PM. In the illustrated embodiment, the stem 21 has a rectangular cross-section. In other embodiments, the stem 21 may have cross-sections different from rectangular such as circular, etc.

Figure 3:
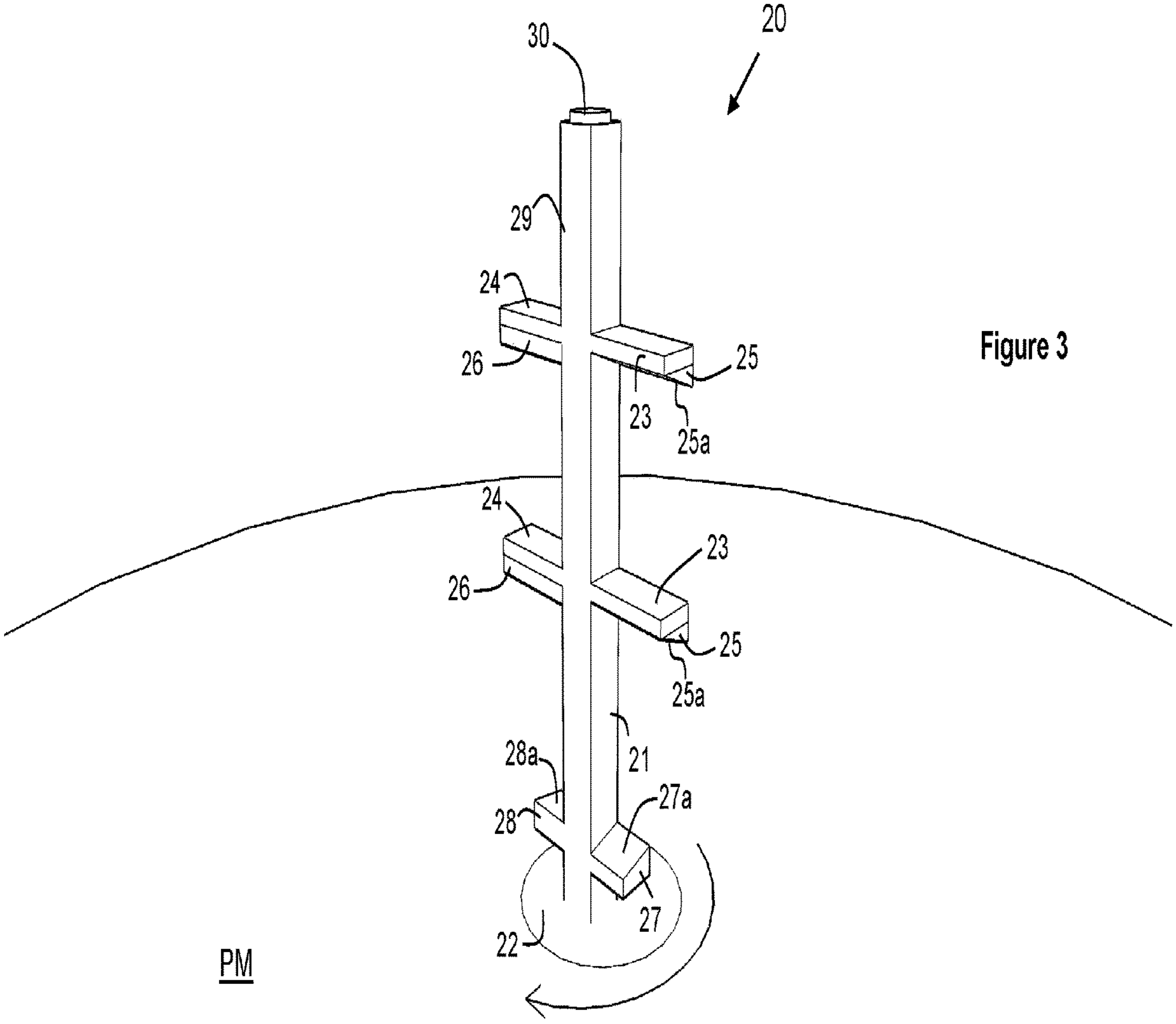
FIG. 3 illustrates a perspective view of an exemplary mounting assembly in the unlocked position.
Figure 4:
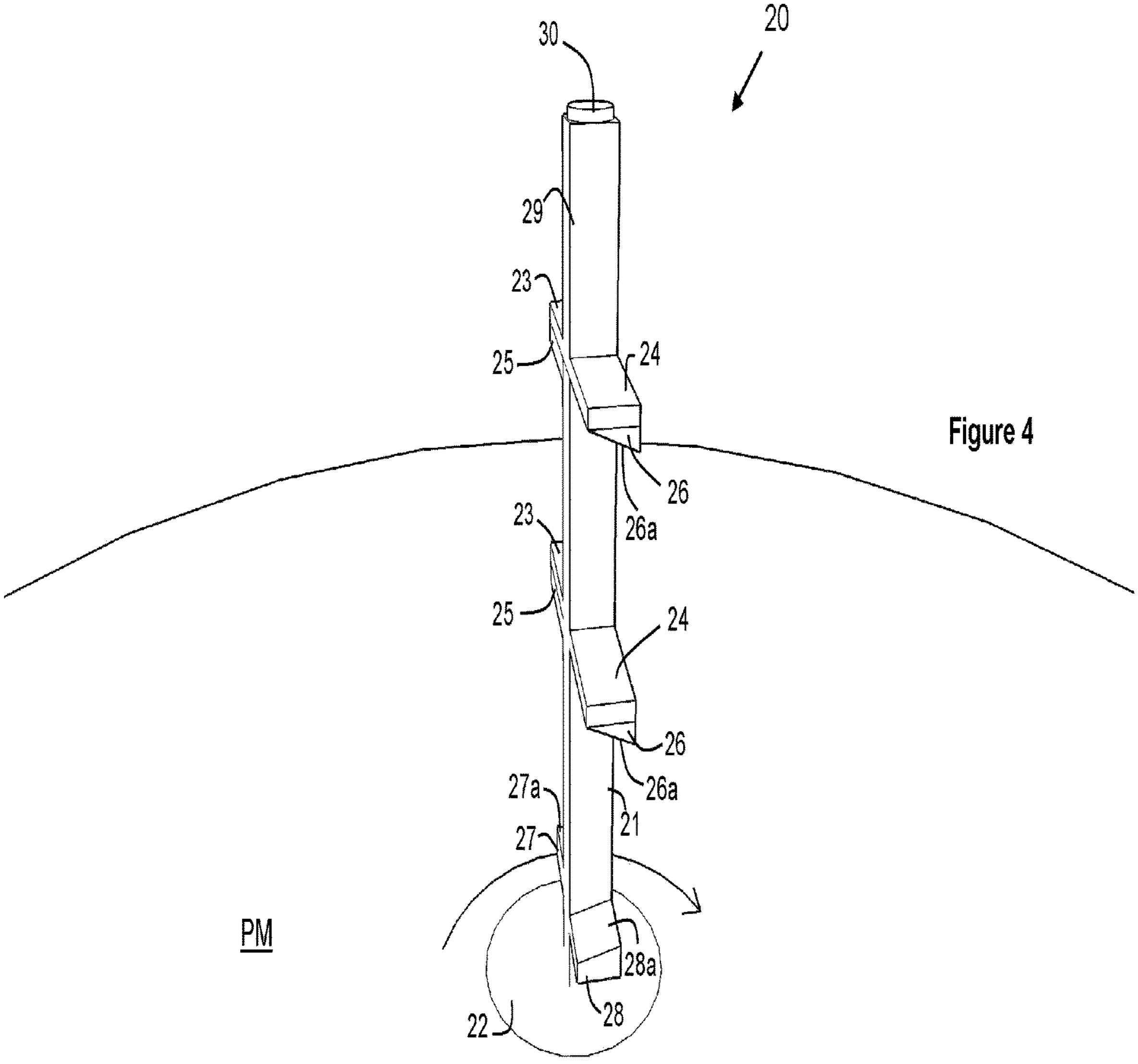
FIG. 4 illustrates a perspective view of the exemplary mounting assembly of FIG. 3 from a different orientation.
Figure 5:
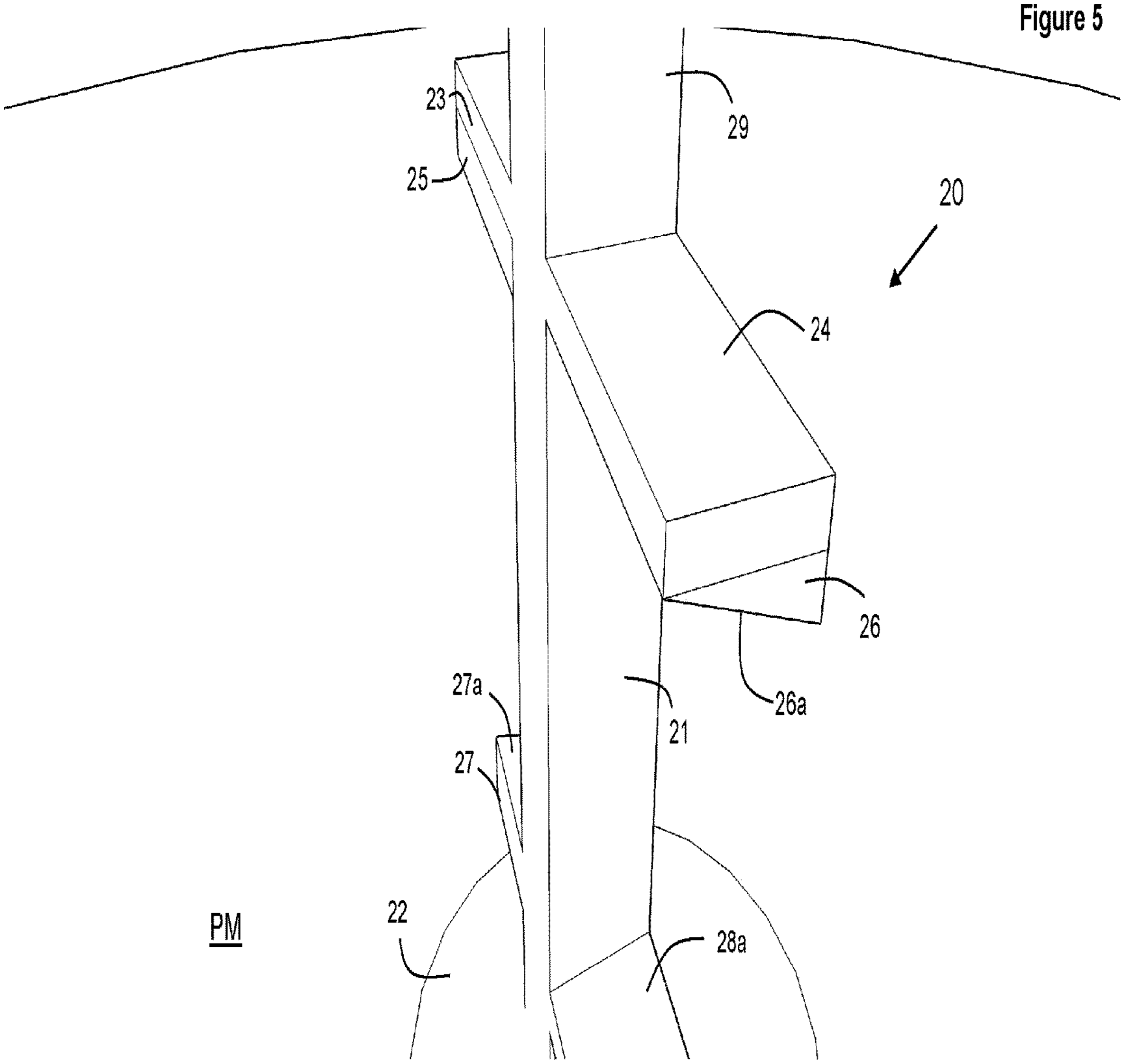
FIG. 5 illustrates a magnified view of the exemplary mounting assembly of FIG. 4.

In FIG. 3 the mounting assembly 20 is shown in a similar position as in FIG. 1A. In FIG. 4 the mounting assembly 20 is shown rotated about 130 degrees for illustrative purposes. The mounting assembly 20 may also include electrode arms 23, 24 extending perpendicularly from the stem 21. FIG. 5 illustrates a magnified view of the mounting assembly 20 to show details of the electrode arms 23, 24. In FIG. 5, the mounting assembly is in a similar position as in FIG. 4. In the illustrated embodiment, a first electrode arm 23 extends perpendicularly from a first side of the stem 21 while a second electrode arm 24 extends perpendicularly from an opposite side of the stem 21. In the illustrated embodiment, the mounting assembly 20 includes two sets of electrode arms 23, 24. In other embodiments (not shown), the mounting assembly 20 may include one set of electrode arms 23, 24 or more than two sets of electrode arms 23, 24.

The electrode arms 23, 24 may have coupled to or formed thereon electrodes 25, 26. The first electrode 25 is disposed on the first electrode arm 23 to form or to have a first incline surface 25*a*. Similarly, the second electrode 26 is disposed on the second electrode arm 24 to form or to have a second incline surface 26*a*. While in the illustrated embodiments, the first and second incline surfaces 25*a*, 26*a* are shown as flat surfaces, in other embodiments the first and second incline surfaces 25*a*, 26*a* may be curved surfaces that nonetheless are inclined or ramped. The electrodes 25, 26 are conductors (e.g., copper, aluminum, etc.) that extend at least some of the length of the corresponding electrode arm 23, 24. For example, a first electrode arm 23 may have coupled or formed thereon a positive electrode 25 while a second electrode arm 24 may have coupled or formed thereon a negative electrode 26. In the illustrated embodiment, each of the electrode arms 23, 24 has one electrode 25, 26 coupled or formed thereon. In other embodiments (not shown), each of the electrode arms 23, 24 may include more than one electrode 25, 26 coupled or formed thereon.

In the illustrated embodiment, the electrodes 25, 26 are coupled or formed on the bottom of the electrode arms 23, 24. In other embodiments (not shown), the electrodes 25, 26 may be coupled or formed on the top of the electrode arms 23, 24 or on both the top and bottom of the electrode arms 23, 24. The electrodes 25, 26 are intended to electrically engage the electrodes 16, 17 of the track 10 or in-junction-box assembly 50 to provide positive and negative electrical connections, respectively, to the powered module PM.

Figure 6:
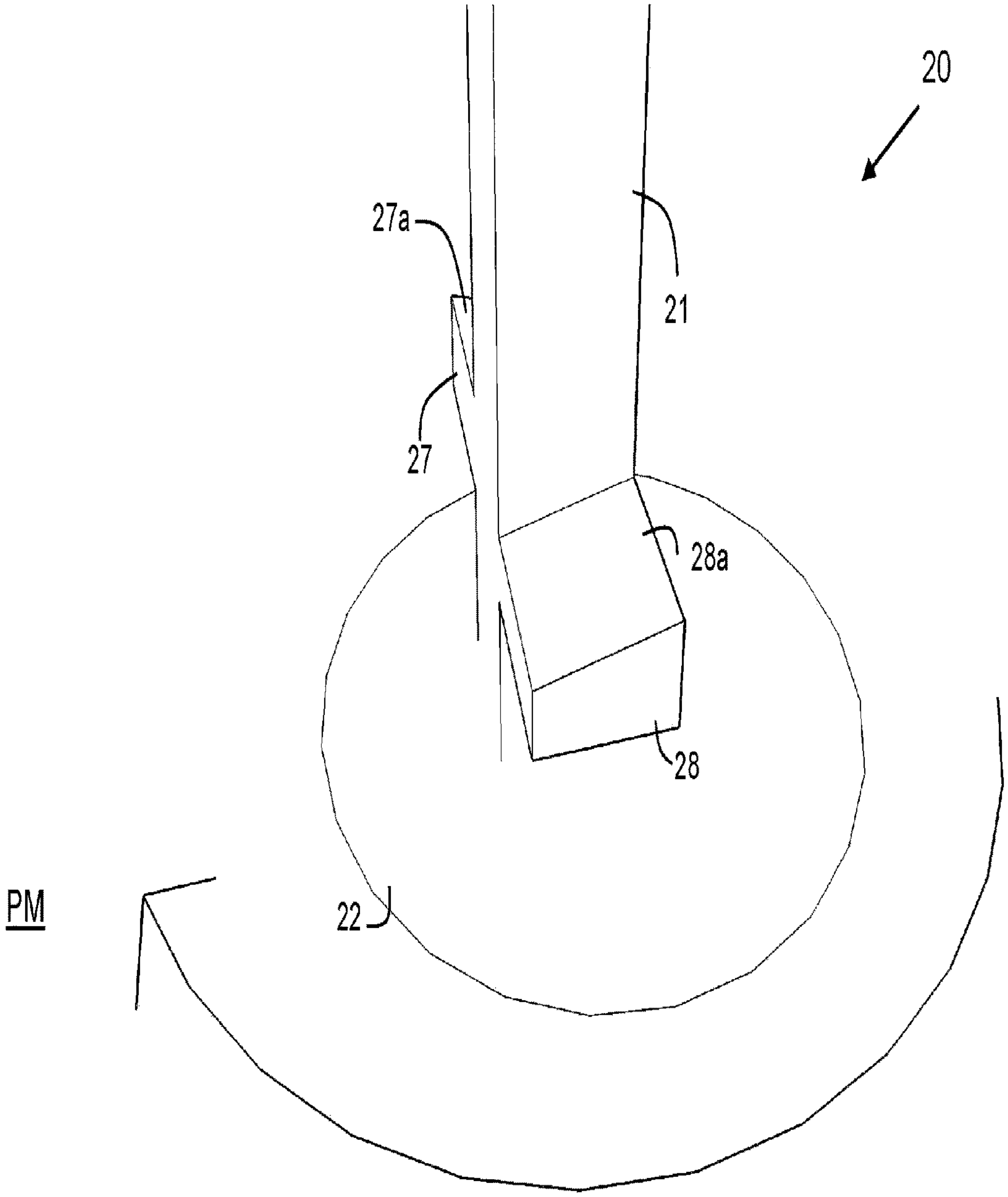
FIG. 6 illustrates a magnified view of the exemplary mounting assembly of FIG. 4.

The mounting assembly 20 may also include locking arms 27, 28 extending perpendicularly from the stem 21. FIG. 6, in addition to FIGS. 1-5, illustrate the locking arms 27, 28. FIG. 6 illustrates a magnified view of the mounting assembly 20 to show details of the locking arms 27, 28. In FIG. 6, the mounting assembly is a similar position as in FIGS. 4 and 5. In the illustrated embodiment, a first locking arm 27 extends perpendicularly from a first side of the stem 21 while a locking arm 28 extends perpendicularly from an opposite side of the stem 21. The locking arms 27, 28 have formed thereon decline surfaces 27*a*, 28*a*. While in the illustrated embodiments, the first and second decline surfaces 27*a*, 28*a* are shown as flat surfaces, in other embodiments the first and second decline surfaces 27*a*, 28*a* may be curved surfaces that nonetheless are declined or ramped.

Notice, particularly in FIGS. 1 and 3, that a plane of the first incline surface 25*a* intersects a plane of the first decline surface 27*a*. Similarly, as best shown in FIG. 4, a plane of the second incline surface 26*a* intersects a plane of the second decline surface 28*a*. As described in more detail below, this characteristic of the incline surfaces 25*a*, 26*a* relative to the decline surfaces 27*a*, 28*a* allows the mounting assembly 20 to be easily insertable in the track 10 or in-junction-box assembly 50 and securely mechanically and electrically engageable to the track 10 or in-junction-box assembly 50.

Figure 7:
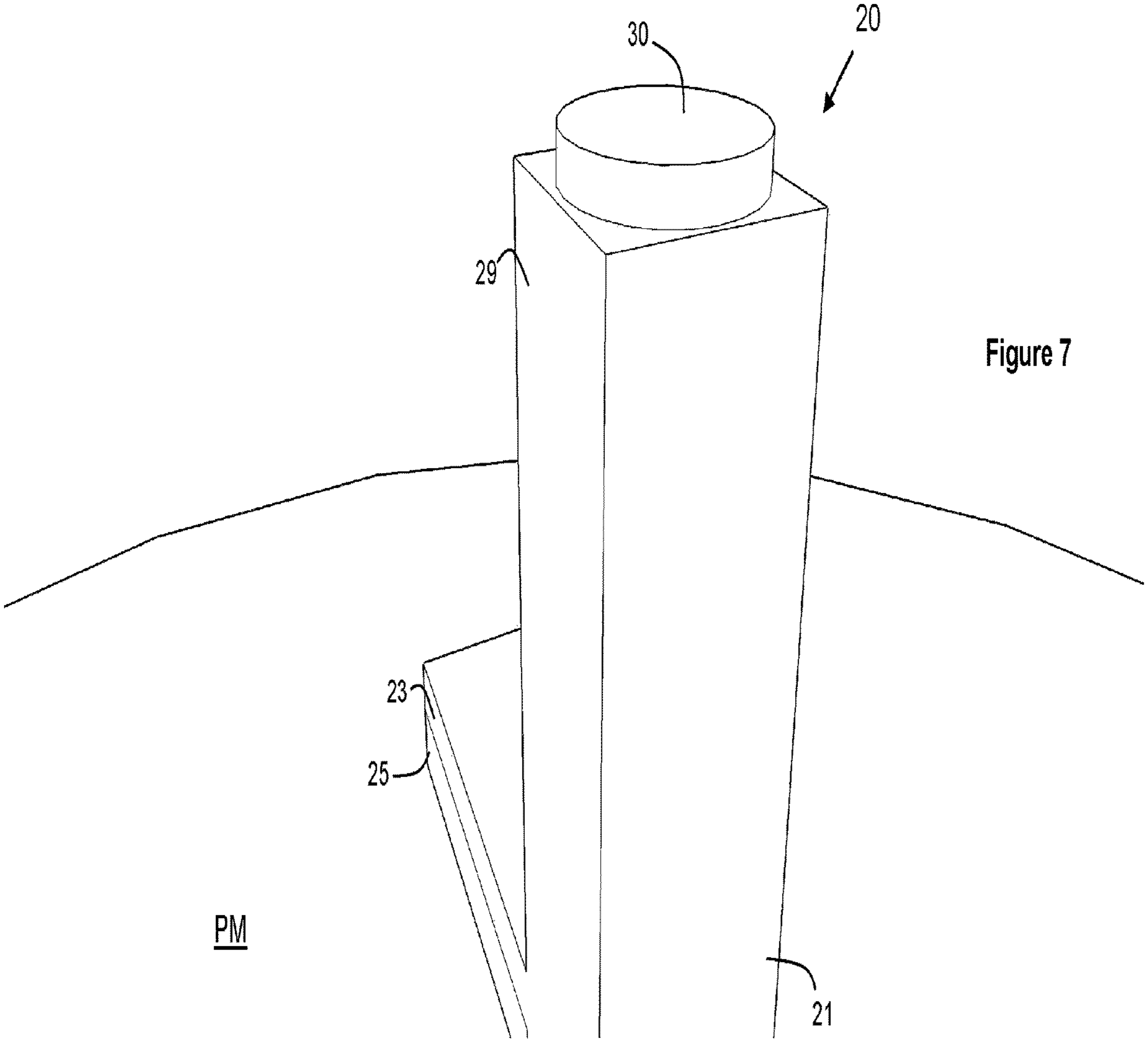
FIG. 7 illustrates a magnified view of the exemplary mounting assembly of FIG. 4.

The mounting assembly 20 may also include a ground arm 29 extending from the top of the stem 21 distal the base 22. FIG. 7 illustrates a magnified view of the ground arm 29. The ground arm 29 may have coupled or formed thereon a ground electrode or ground contact 30. The ground contact 30 may be a conductor (e.g., copper, aluminum, etc.) and it is intended to electrically engage the ground conductor 18 of the track 10 or in-junction-box assembly 50 to provide a ground connection to the powered module PM. The ground contact 30 may be elastically connected to the ground arm 29 extending from the top of the stem 21. In one embodiment, the mounting assembly 20 includes a spring disposed between the ground electrode 30 and the distal end 29. In other embodiments, the ground contact 30 may be elastically connected to the ground arm 29 by other elastic means such as, for example, an elastomer, etc. In one embodiment, the ground contact 30 is not elastically connected to the ground arm 29.

The mounting assembly 20 may also include electrical connections (e.g., wires, printed circuit board, etc.) to electrically connect the electrodes 25, 26 and the ground contact 30 to the powered module PW. For example, the mounting assembly 20 may include electrical terminals at or near the base 22 and electrical connections within the arms 23 and 24, and the stem 21 that electrically connect the electrodes 25, 26 and the ground contact 30 to the electrical terminals. Wiring of the powered module PM may connect to the electrical terminals of the mounting assembly 20 to power the powered module PM.

Powered Module Installation

A method of mounting a powered module PM including or having coupled thereon the mounting assembly 20 to a track 10 or in-junction-box assembly 50 would be described now in reference to the figures.

First, a user may insert the stem 21 in the orientation shown in FIG. 1A into the groove or opening G formed between the locking rails 14 and between the electrode rails 12, 13. In the illustrated embodiment, inserting the stem 21 into the groove G until the ground contact 30 contacts the ground conductor 18 results in the electrode arms 23, 24 being simultaneously inserted into the groove G while the locking arms 28 remain uninserted into the groove G.

If using the track system 1, at this point, the user may slide the powered module PM to a desired position along the track 10.

The user may then rotate the powered module PM clockwise for the incline surfaces 25*a*, 26*a* of the electrodes 25, 26 of the mounting assembly 20 to engage the electrodes 16, 17 of the track 10 or in-junction-box assembly 50. In the illustrated embodiment, the incline and decline surfaces are disposed such that clockwise rotation locks the mounting assembly 20 to the track 10 or in-junction-box assembly 50. In other embodiments, the incline and decline surfaces may be disposed such that counter clockwise rotation of the powered module PM result in locking of the mounting assembly 20 to the track 10 or in-junction-box assembly 50. In the illustrated embodiment, this clockwise rotation of the powered module PM simultaneously causes engagement of the decline surfaces 27*a*, 28*a* of the locking arms 27, 28 of the mounting assembly 20 to bottom sides 14*b* of the locking rails 14 of the lighting track 10 or in-junction-box assembly 50.

Simultaneous pressure of the incline surfaces 25*a*, 26*a* against the electrodes 16, 17 and of the decline surfaces 27*a*, 28*a* against the bottom sides 14*b* of the locking rails 14 mechanically creates a locking, spring-like, effect of the mounting assembly 20 to the track 10 or in-junction-box assembly 50. This simultaneous pressure also provides adequate electrical connection between the electrodes 25, 26 and the electrodes 16, 17. In one embodiment, the incline surfaces 25*a*, 26*a* and/or the decline surfaces 27*a*, 28*a* may include a particularly sharp edge to bite into the electrodes 16, 17 and/or the bottom sides 14*b* of the locking rails 14, respectively, to provide an additional locking effect. Finally, this arrangement results in adequate electrical connection between the ground contact 30 and the ground conductor 18, particularly if the ground contact 30 is elastically connected to the ground arm 29.

In one embodiment, the mounting assembly 20 may not include the locking arms 27, 28 and, instead, the system 1 may rely on simultaneous pressure of the incline surfaces 25*a*, 26*a* against the electrodes 16, 17 and of the ground contact 30 against the ground conductor 18. In this embodiment, the ground arm 29 acts as a locking arm and the ground contact 30 as locking surface. Notice that planes of the incline surfaces 25*a*, 26*a* intersect a plane of the ground contact or locking surface 30 resulting in elastic repulsive pressure when the mounting assembly 20 is inserted in the groove G and rotated clockwise. This elastic repulsive pressure not only results in adequate electrical connection between the ground contact 30 and the ground conductor 18 but also creates a locking spring-like effect of the mounting assembly 20 to the track 10 or in-junction-box assembly 50. Thus, this simultaneous pressure may also provide adequate electrical connection between the electrodes 25, 26 and the electrodes 16, 17. This pressure may be particularly controllable in an embodiment in which the ground contact 30 is elastically (e.g., spring loaded) connected to the ground arm 29. In one embodiment, the incline surfaces 25*a*, 26*a* may include a particularly sharp edge to bite into the electrodes 16, 17 to provide an additional locking effect.

Removal or reinstallation of a powered module PM is just as convenient. The user may rotate the powered module in the opposite direction (e.g., counter-clockwise in the illustrated embodiment) to disengage the incline surfaces 25*a*, 26*a* of the electrodes 25, 26 of the mounting assembly 20 from the electrodes 16, 17 of the track 10 or in-junction-box assembly 50. This rotation also disengages the decline surfaces 27*a*, 28*a* from the bottom 14*b* of the bottom rail 14. The user may rotate the powered module PM until the mounting assembly 20 is oriented in the inserted position as shown in FIG. 1A. The user may then simply remove the power module PM from the track 10 or slide the power module PM to any desired position along the track 10 for installation at that new position. Similarly, the user may then simply remove the power module PM from the in-junction-box assembly 50.

Wall Track System I

Figure 8A:
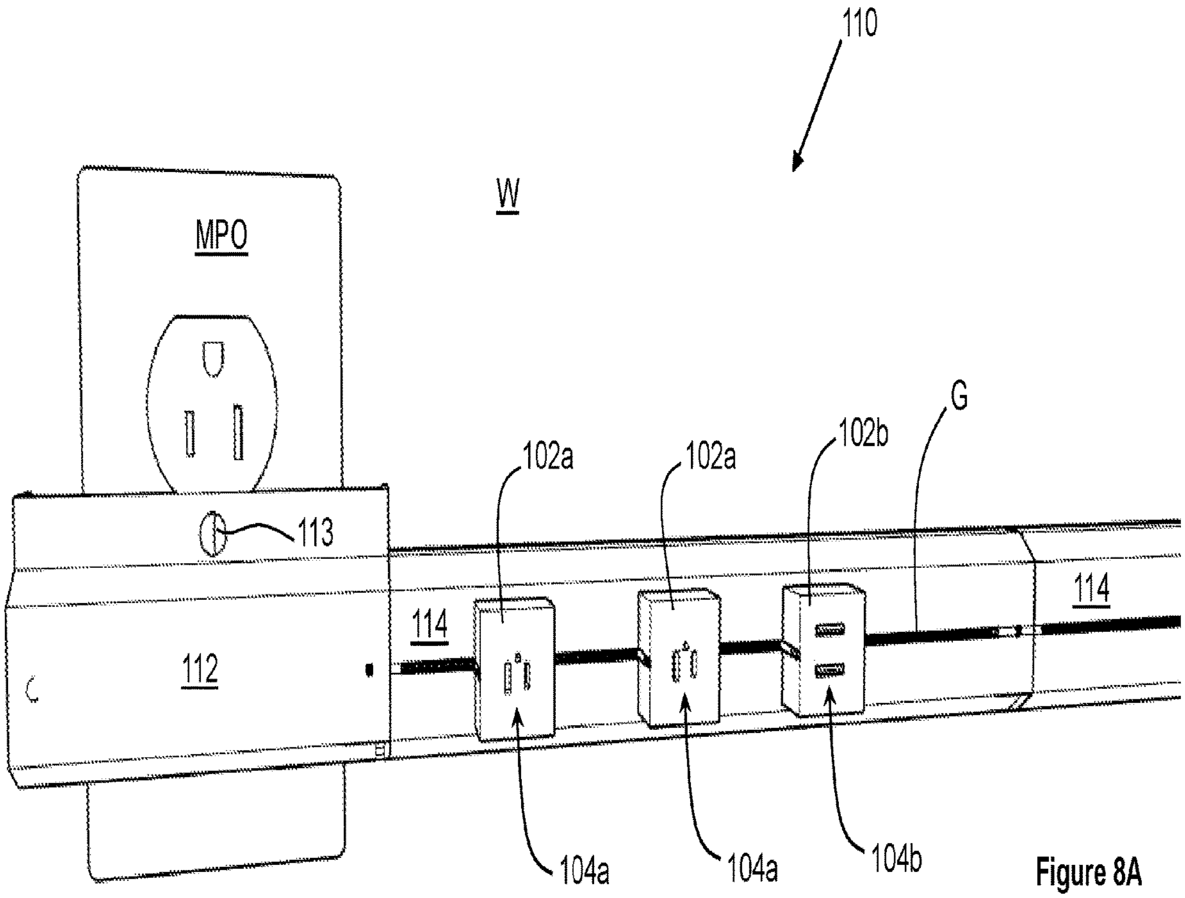
FIGS. 8A-8D illustrate perspective views of an exemplary track for mechanical and electrical engagement of a power outlet module to a wall.
Figure 8B:
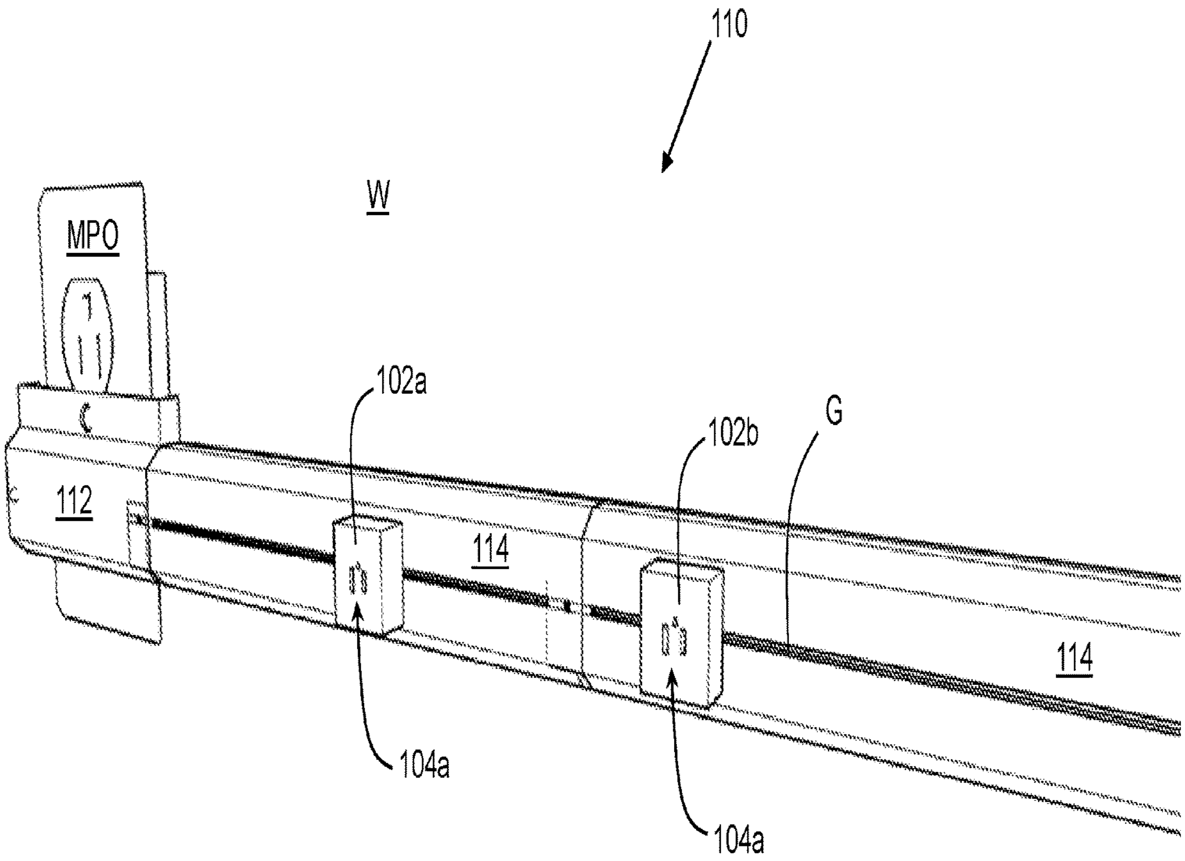

FIGS. 8A-8D illustrate perspective views of a track 110 for mechanical and electrical engagement of a power outlet module 102 to a wall W. The power outlet module 102 may be any module that provides power (AC or DC) to operate pluggable powered devices such as, for example, a light fixture, a speaker, a wi-fi router or repeater, a smoke detector, etc. The power outlet module 102 may include or have built thereon one or more standard AC mains power outlets configurations (e.g., NEMA 1-15 Type A, NEMA 5-15 Type B, JIS C 8303 Class I and II, CEE 7/1, CEE 7/3, CEE 7/5, etc.) FIG. 8A illustrates two different types of modules 102*a* and 102*b* with power outlets 104*a* and 104*b*, respectively. As described below, the system 101 provides convenient installation of the power outlet module 102 to the wall W.

Track

The interior construction of the track 110 is very similar to that of track 10 described above. The track 110 may include a back rail 11 and electrode rails 12, 13. The track 10 may also include side walls 15 connecting the back rail 11 and the electrode rails 12,13 as well as electrodes 16, 17 and ground conductor 18 coupled or formed thereon.

Figure 8C:
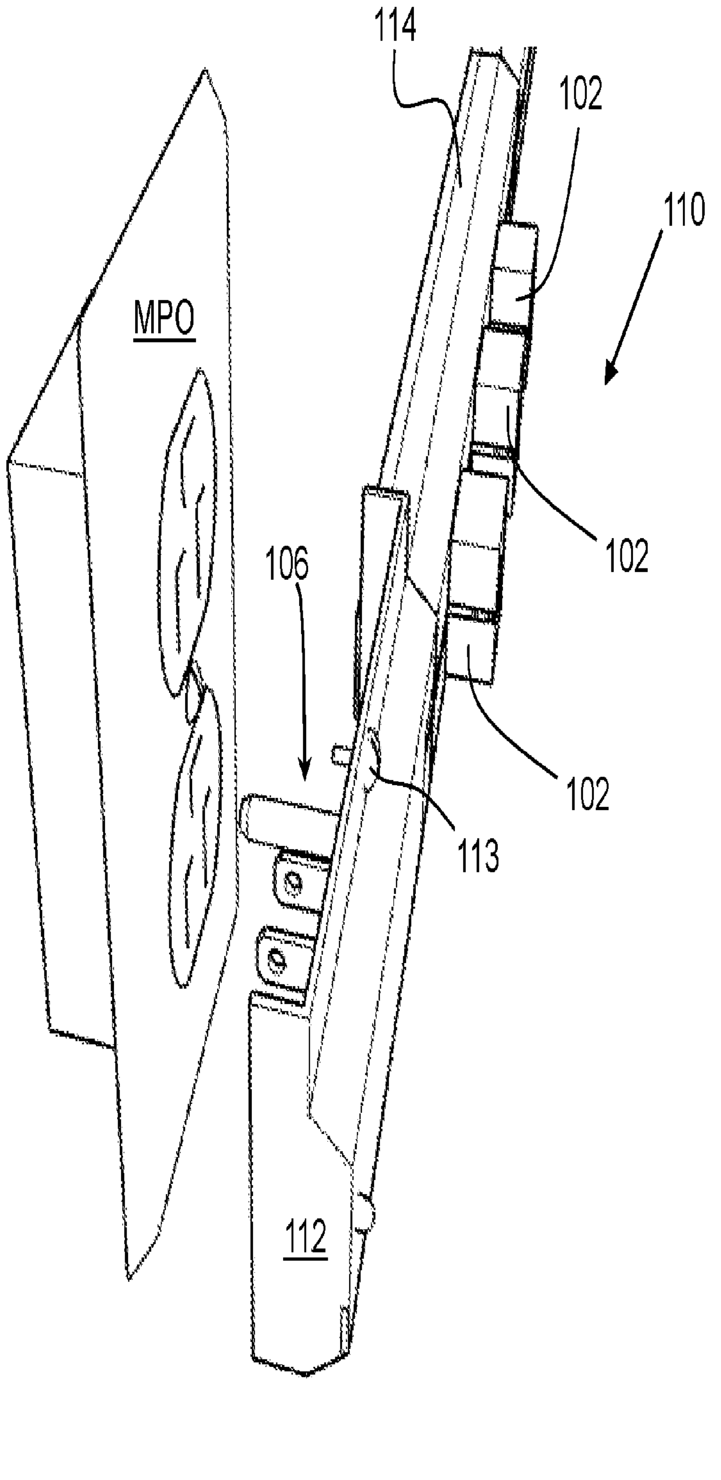
Figure 8D:
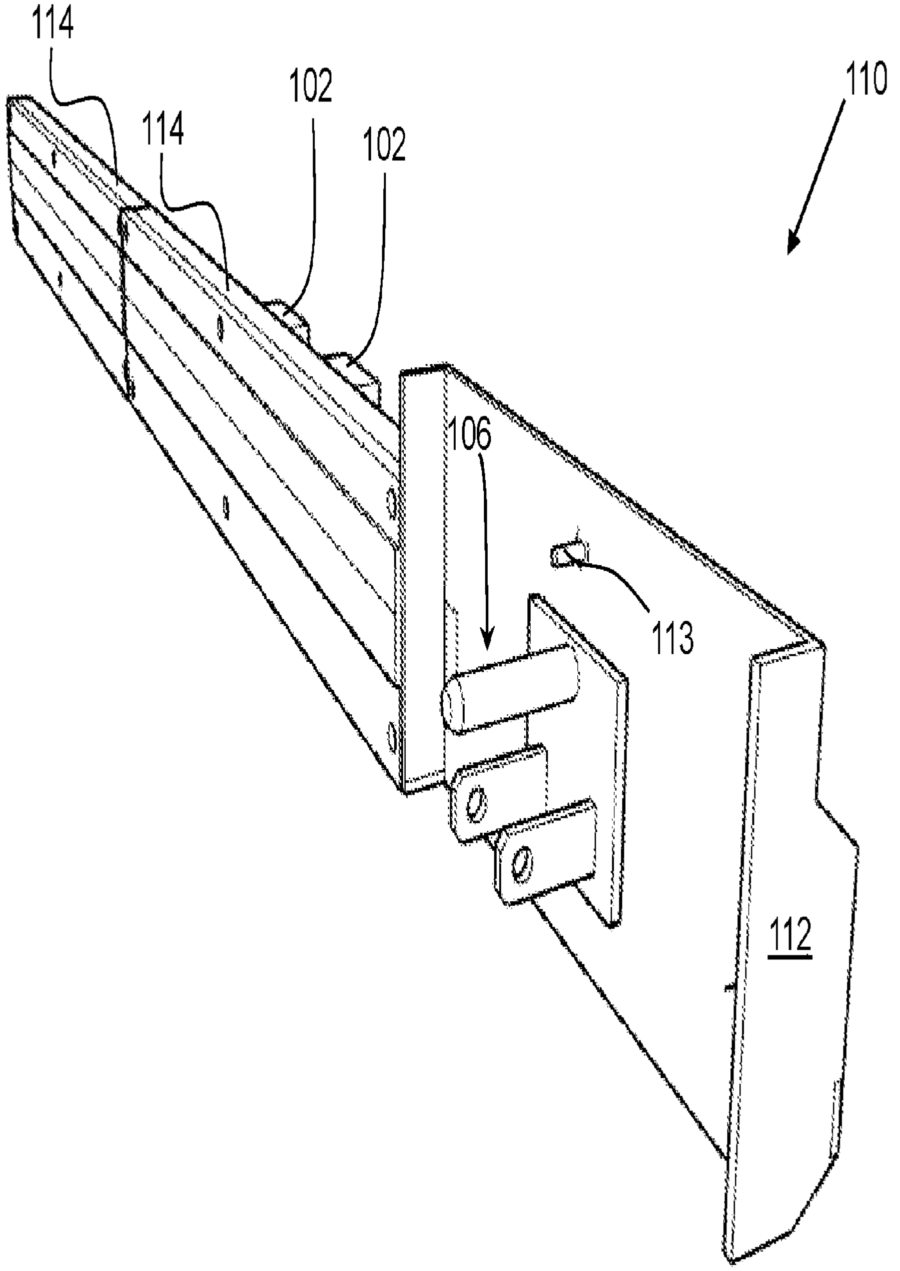

As shown in FIGS. 8C and 8D, the track 110 may include a power plug 106 that plugs to a standard AC mains power outlet MPO (e.g., NEMA 1-15 Type A, NEMA 5-15 Type B, JIS C 8303 Class I and II, CEE 7/1, CEE 7/3, CEE 7/5, etc.). The contacts of the plug 106 may be electrically connected to the electrodes 16, 17, and the ground conductor 18 and, thereby, to the power outlets 104.

Figure 9A:
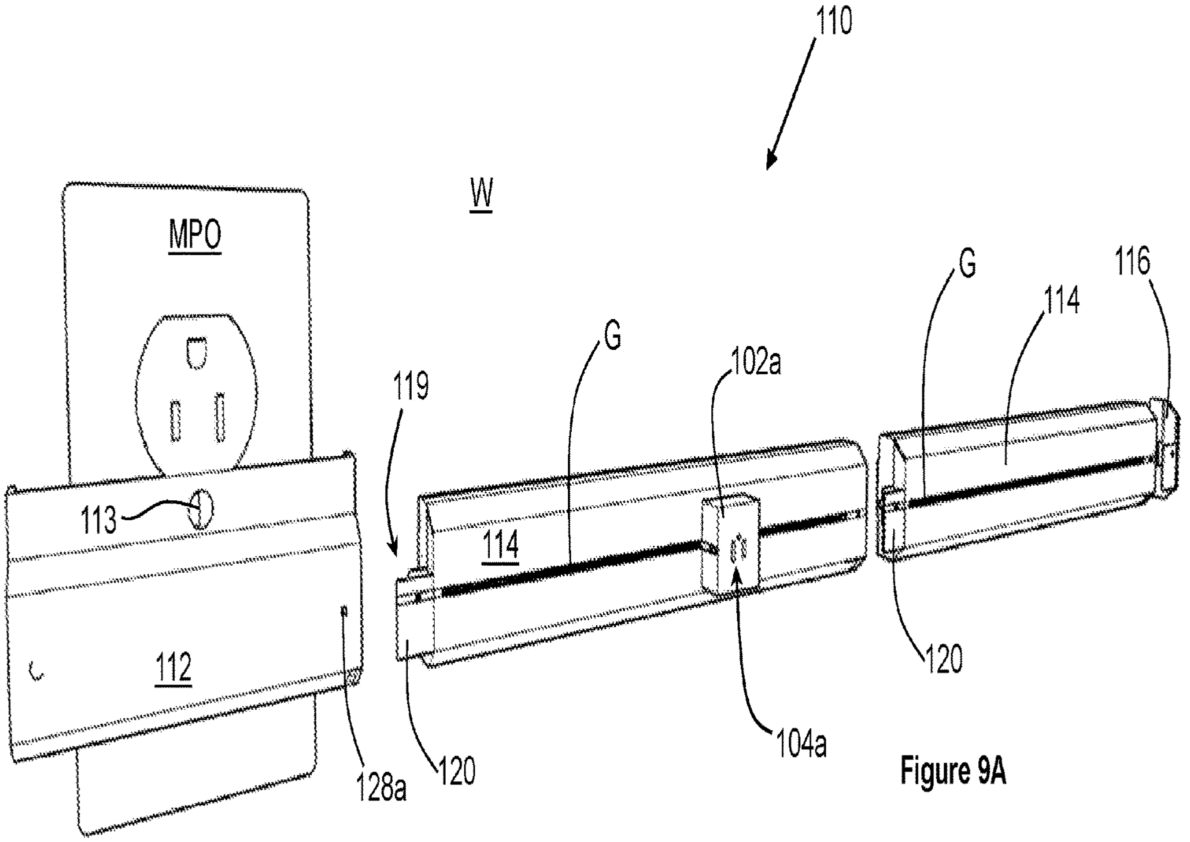
FIGS. 9A-9E illustrate an exemplary track formed of various track portions.
Figure 9B:
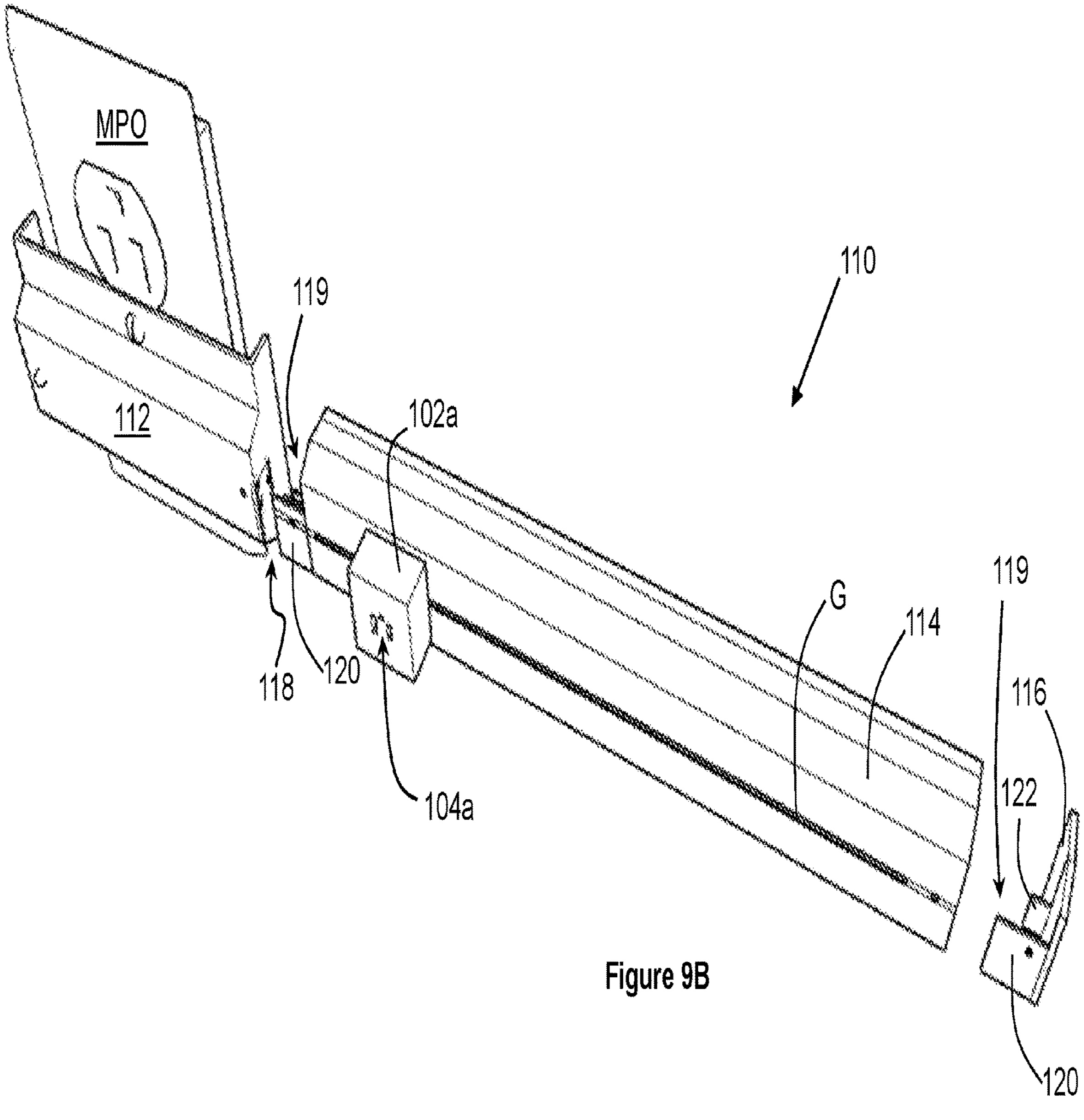

As shown in FIGS. 9A and 9B, the track 110 may be formed of various portions including a power input portion 112, one or more power track portions 114, and an end bracket portion 116.

Figure 9C:
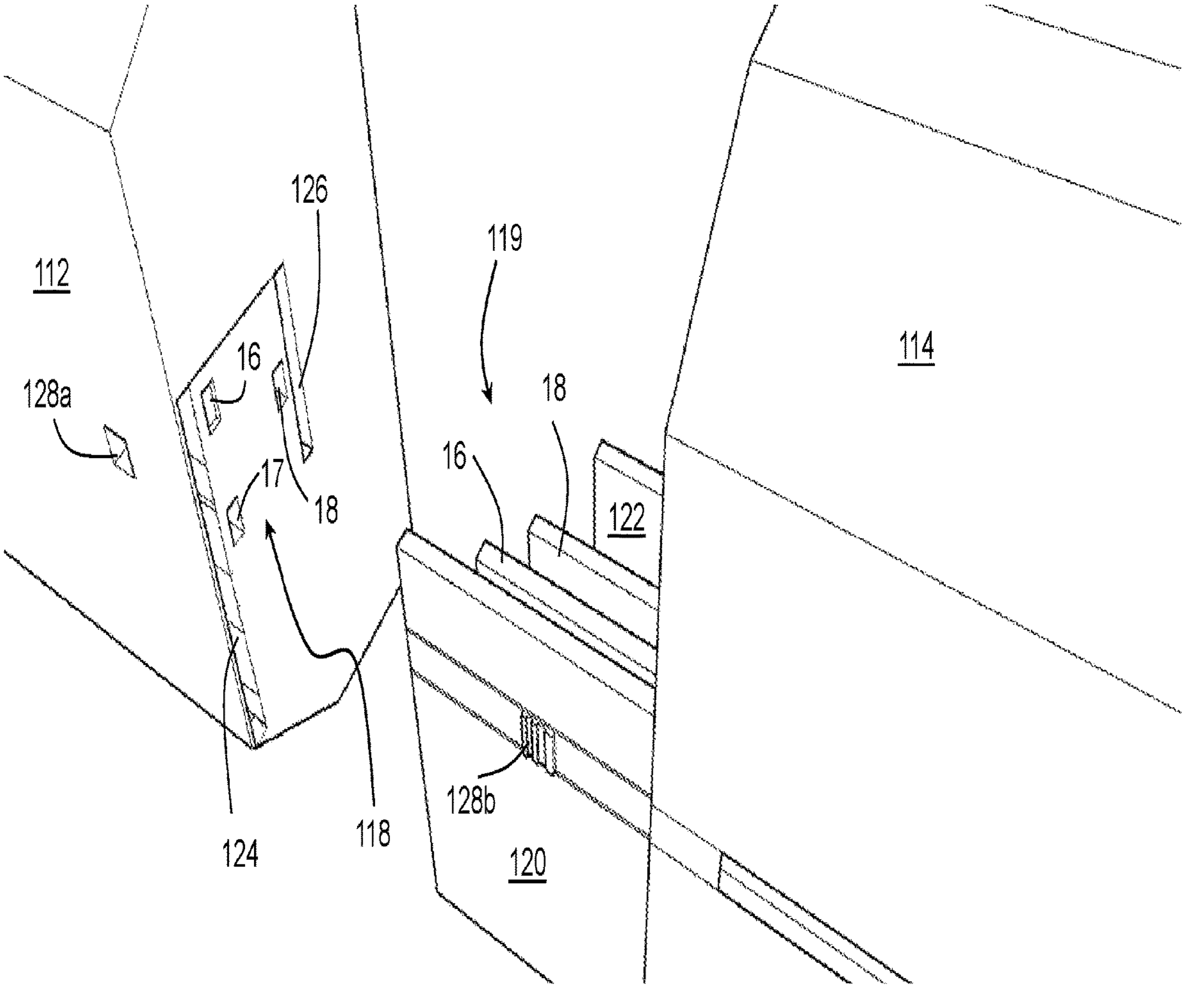
Figure 9D:
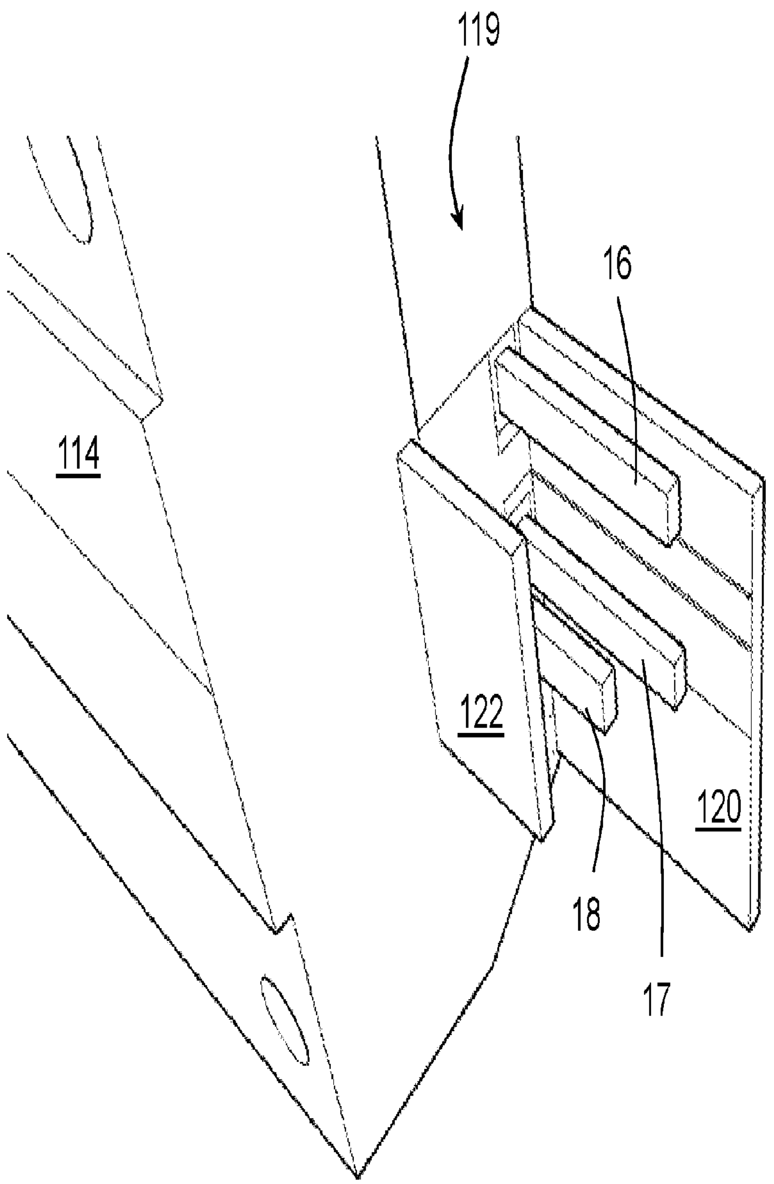

The power input portion 112 includes or has formed thereon the plug 106 with respective contacts or terminals (e.g., live, neutral, ground). The power input portion 112 also includes respective portions of the electrodes 16, 17 and ground conductor 18 electrically connected to the plug 106 and, thereby, to the power outlet MPO. FIG. 9C illustrates a magnified view of the exemplary power input portion 112, which includes a power port 118 which includes connector ends for the first electrode 16, the second electrode 17, and the ground electrode 18 for connecting to extending portions of the first electrode 16, the second electrode 17, and the ground electrode 18 extending from an end of the track portion 114. In another embodiment, the power input portion 112 includes a power port 119 (as shown in FIG. 9D) that includes extending portions of the first electrode 16, the second electrode 17, and the ground electrode 18 extending beyond the end of the power input portion 112 so that the extending portions of the first electrode 16, the second electrode 17, and the ground electrode 18 may connect to a power port 118 of another track portion. The track 110 and specifically the power input portion 112 may include a standard screw 113 to fasten the power input portion to the outlet MPO.

Figure 9E:
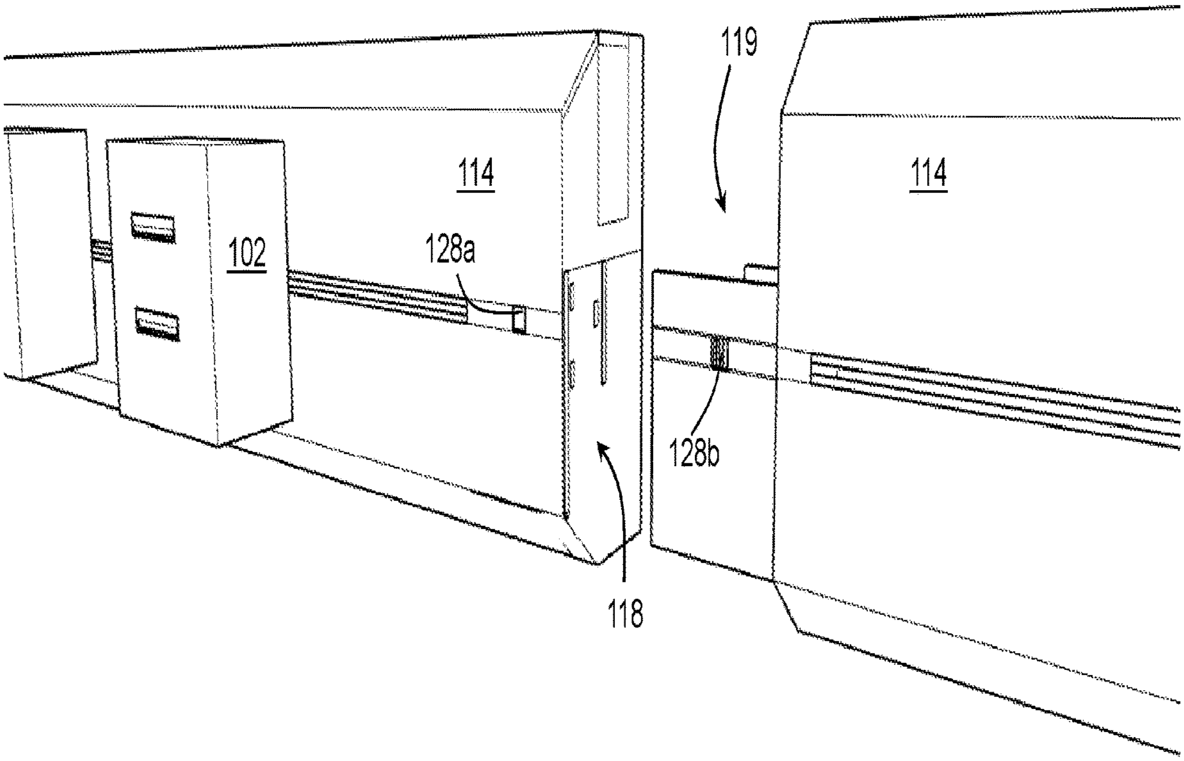

FIG. 9D illustrates a magnified view of an end of the exemplary power track portion 114, which includes a power port 119 that includes the first electrode 16, the second electrode 17, and the ground electrode 18 extending beyond an end of the track portion 114 (or another track portion). The power track portion 114 may also have at another end a power port 118 (as shown in FIG. 9C) which includes connector ends for the first electrode 16, the second electrode 17, and the ground electrode 18 for connecting to a power port 119 including extending portions of the first electrode 16, the second electrode 17, and the ground electrode 18 extending from an end of another track portion. As shown in FIG. 9E, further power track portions 114 may be added to the track 110 until a desired or maximum length is reached. This way power may travel through the track 110 from the power plug 106 to the power outlets 104 of the power outlet modules 102 installed to the track portions 114.

As shown in FIG. 9B, end bracket portion 116 may include a port similar to the port 118 or the port 119 to cap the last power track portion 114 in the track 110. The port 118 or 119 of the end bracket portion 116 may include receivers that do not connect electrically to anything as the end bracket portion 116 is meant mostly to cover exposed portions of first electrode 16, the second electrode 17, and the ground electrode 18 of the last power track portion 114 in the track 110.

As shown in FIGS. 9C and 9D, the power port 119 may also include guides 120, 122 and the power port 118 may include guiding ports 124, 126 that interact with each other, respectively, to help guide connection of a power input portion 112 to a power track portions 114, power track portion 114 to one another, and to end bracket portion 116. One or more of the guiding ports 124, 126 may include a locking mechanism 128*a* to engage with a locking mechanism 128*b* of the guides 120, 122 to lock a power input portion 112 to a power track portion 114, power track portions 114 to one another, and to end bracket portion 116.

Figure 10:
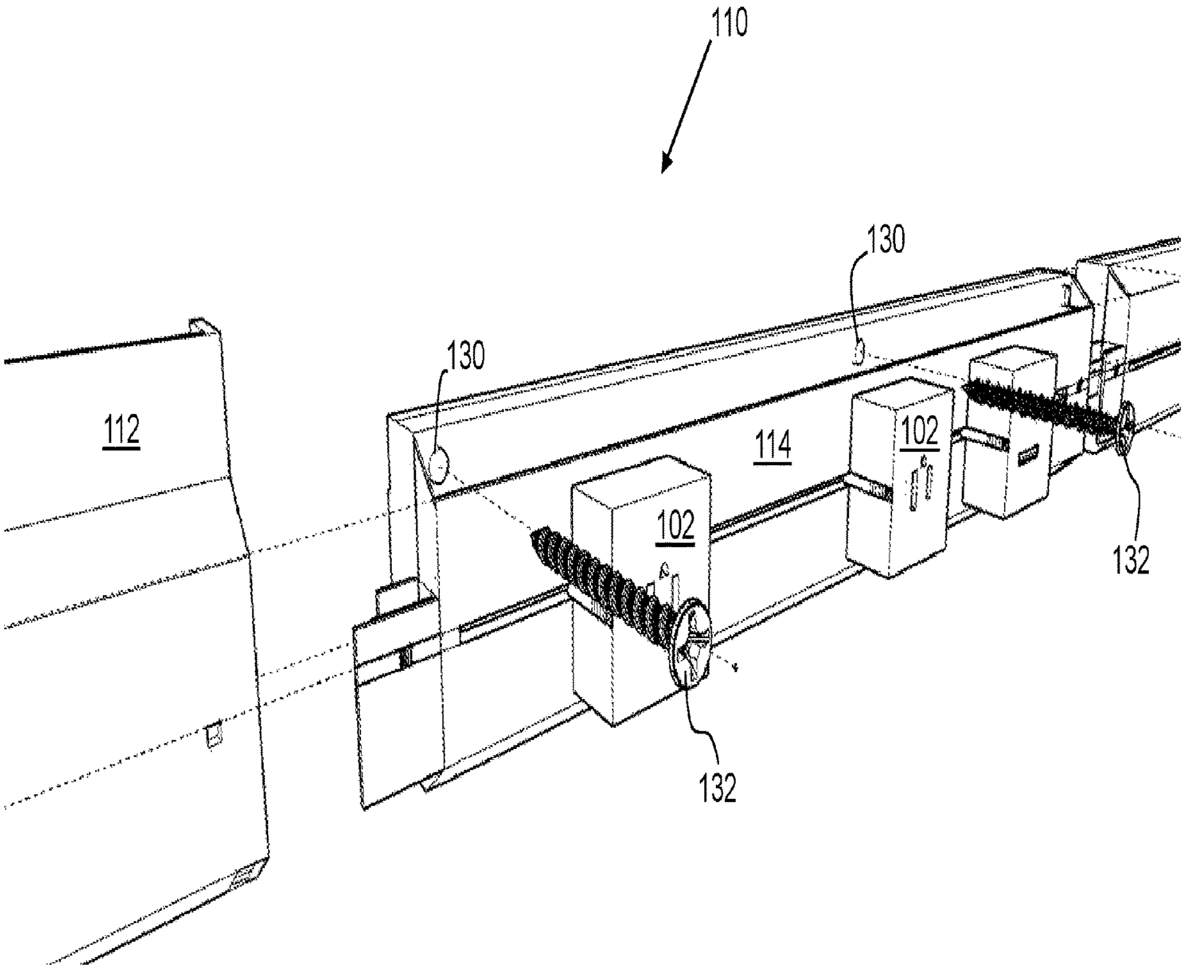
FIG. 10 illustrates an exemplary track and specifically mounting holes disposed on the power track portion.

FIG. 10 illustrates an exemplary track 110 and specifically mounting holes 130 disposed on the power track portion 114 so that screws 132 may be used to mount the power track portion 114 to the wall W.

Wall Track System II

Figure 11A:
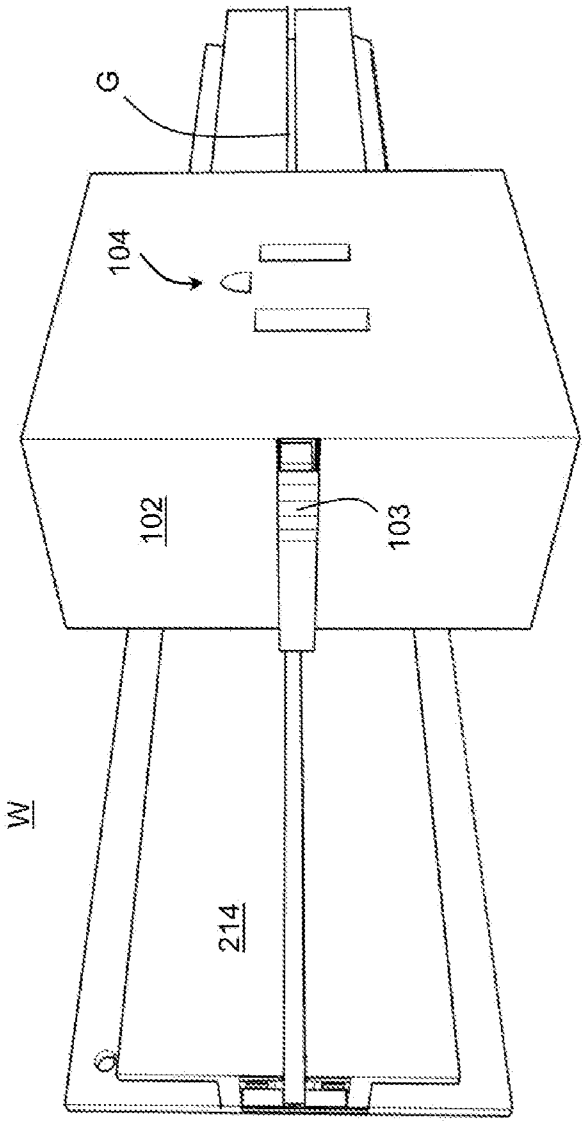
FIGS. 11A and 11B illustrate perspective views of an exemplary track for mechanical and electrical engagement of the power outlet module to a wall.
Figure 11B:
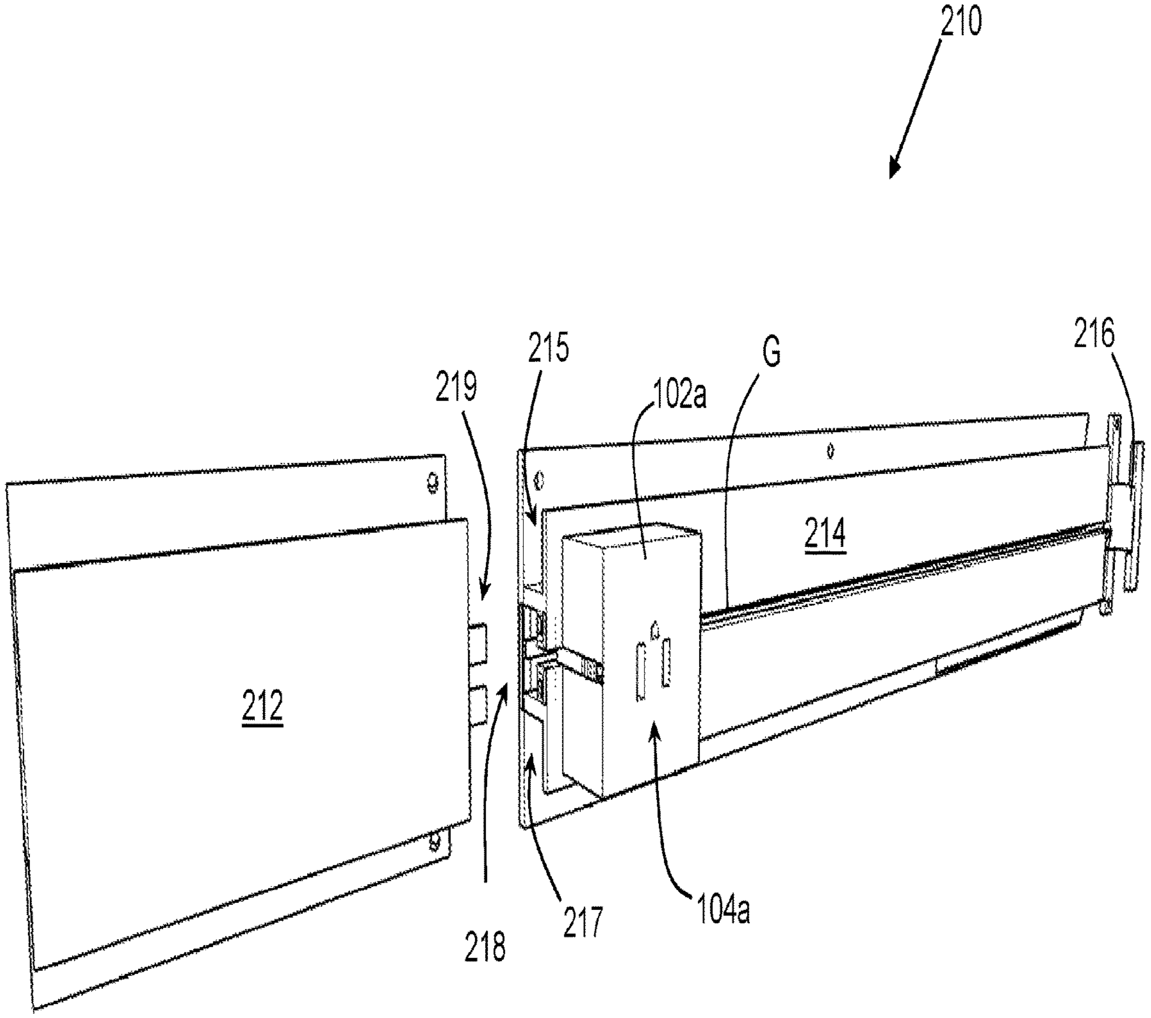

FIGS. 11A and 11B illustrate perspective views of a track 210 for mechanical and electrical engagement of the power outlet module 102 to the wall W. The track 210 is somewhat similar to the track 110 except that the track 210 is intended to be installed flushed with (i.e., within) the wall W while the track 110 is intended for installation or above the wall W. The track 210 is intended for new construction while the track 110 is intended for retrofitting of existing construction.

Track

The interior construction of the track 210 is very similar to that of tracks 10 and 110 described above. The track 210 may include a back rail 11 and electrode rails 12, 13. The track 210 may also include side walls 15 connecting the back rail 11 and the electrode rails 12,13 as well as electrodes 16, 17 and ground conductor 18 coupled or formed thereon.

As shown in FIG. 11B, the track 210 may be formed of various portions including a power input portion 212, one or more power track portions 214, and an end bracket portion 216. Each of these portions top and bottom grooves 215, 217 having widths corresponding to the widths of standard drywall or wood paneling from which commercial or residential interior spaces are made. This way, the track 210 is substantially flushed with (i.e., within) the wall W.

Figure 12A:
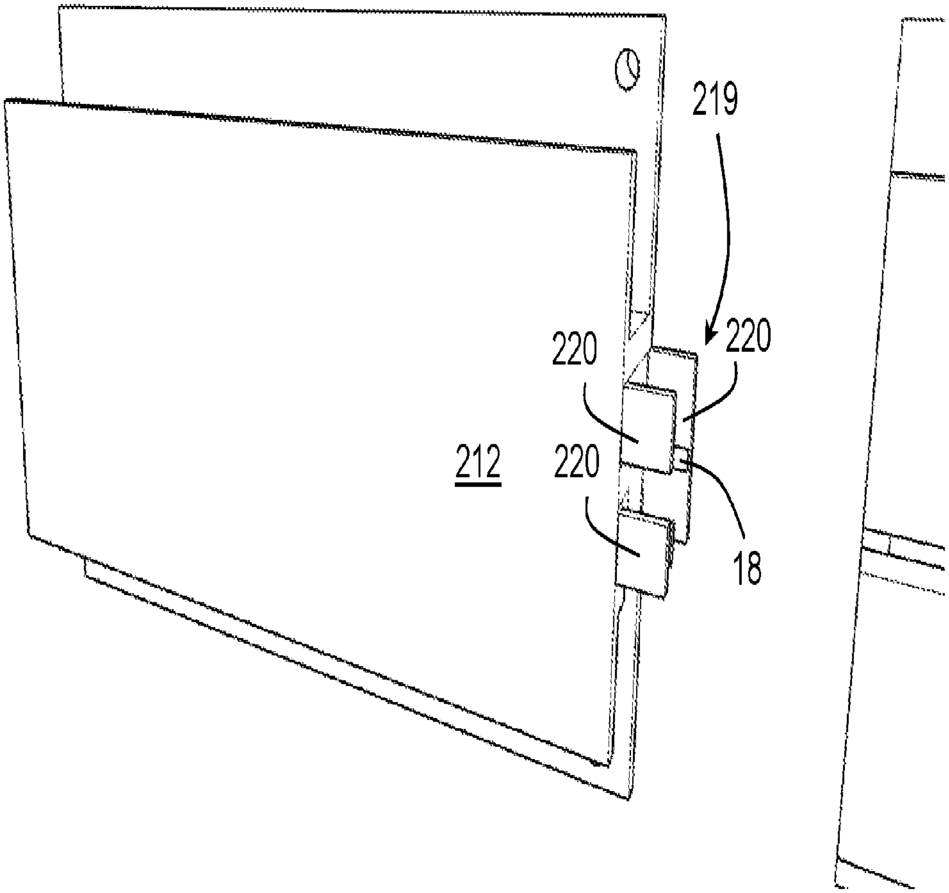
FIGS. 12A and 12B illustrate front and rear views of an exemplary power input portion of the exemplary track.
Figure 12B:
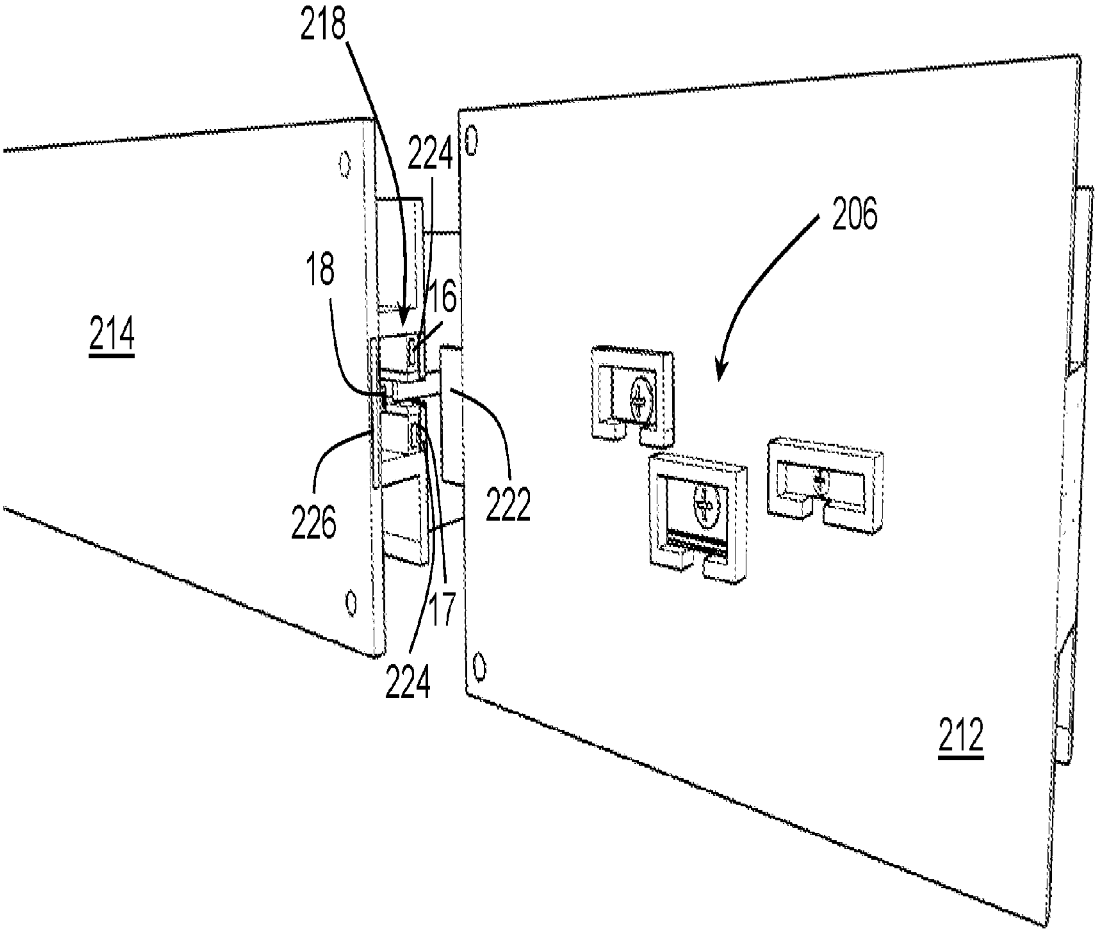

FIGS. 12A and 12B illustrate front and rear views of the power input portion 212. The power input portion 212 includes or has formed thereon the terminal block 206 with respective wire terminals. The power input portion 212 also includes respective portions of the electrodes 16, 17 and ground conductor 18 electrically connected to the terminal block 206 and, thereby, to commercial or residential AC mains. The power input portion 212 may also include a power port 219 that includes extending portions of the first electrode 16, the second electrode 17, and the ground electrode 18 extending beyond the end of the power input portion 212 so that the extending portions of the first electrode 16, the second electrode 17, and the ground electrode 18 may connect to a power port 218 of another track portion. In one embodiment, the power input portion 212 may include a power port 218 which includes connector ends for the first electrode 16, the second electrode 17, and the ground electrode 18 for connecting to extending portions of the first electrode 16, the second electrode 17, and the ground electrode 18 extending from an end of a track portion 114.

Figure 13:
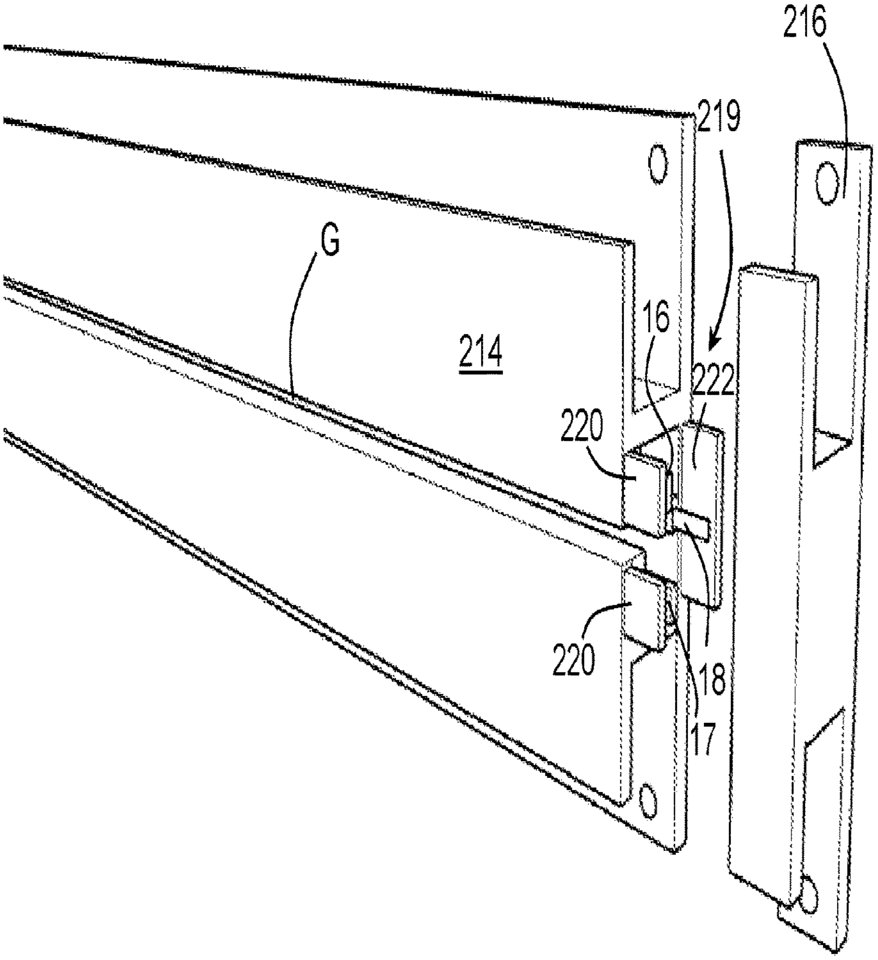
FIG. 13 illustrates a magnified view of an end of the exemplary power track portion.

FIG. 13 illustrates a magnified view of an end of the exemplary power track portion 214, which includes a power port 219 that includes the first electrode 16, the second electrode 17, and the ground electrode 18 extending beyond an end of the track portion 214 (or another track portion). The power track portion 214 may also have at another end a power port 218 (as shown in FIG. 12B) which includes connector ends for the first electrode 16, the second electrode 17, and the ground electrode 18 for connecting to a power port 219 including extending portions of the first electrode 16, the second electrode 17, and the ground electrode 18 extending from an end of another track portion. Further power track portions 214 may be added to the track 210 until a desired or maximum length is reached. This way power may travel through the track 210 from the AC mains connected to the terminal block 206 to the power outlets 104 of the power outlet modules 102 installed to the track portions 214.

As shown in FIG. 13, end bracket portion 216 may include a port similar to the port 218 or the port 219 to cap the last power track portion 214 in the track 210. The port 218 or 219 of the end bracket portion 216 may include receivers that do not connect electrically to anything as the end bracket portion 216 is meant mostly to cover exposed portions of first electrode 16, the second electrode 17, and the ground electrode 18 of the last power track portion 214 in the track 210.

The power port 219 may also include guides 220, 222 and the power port 218 may include guiding ports 224, 226 that interact with each other, respectively, to help guide connection of a power input portion 212 to a power track portions 214, power track portion 214 to one another, and to end bracket portion 216. The track 210 may include mounting holes 230 disposed on the power track portions so that screws may be used to mount the track portion to the wall W.

Powered Module and Installation

Figure 14A:
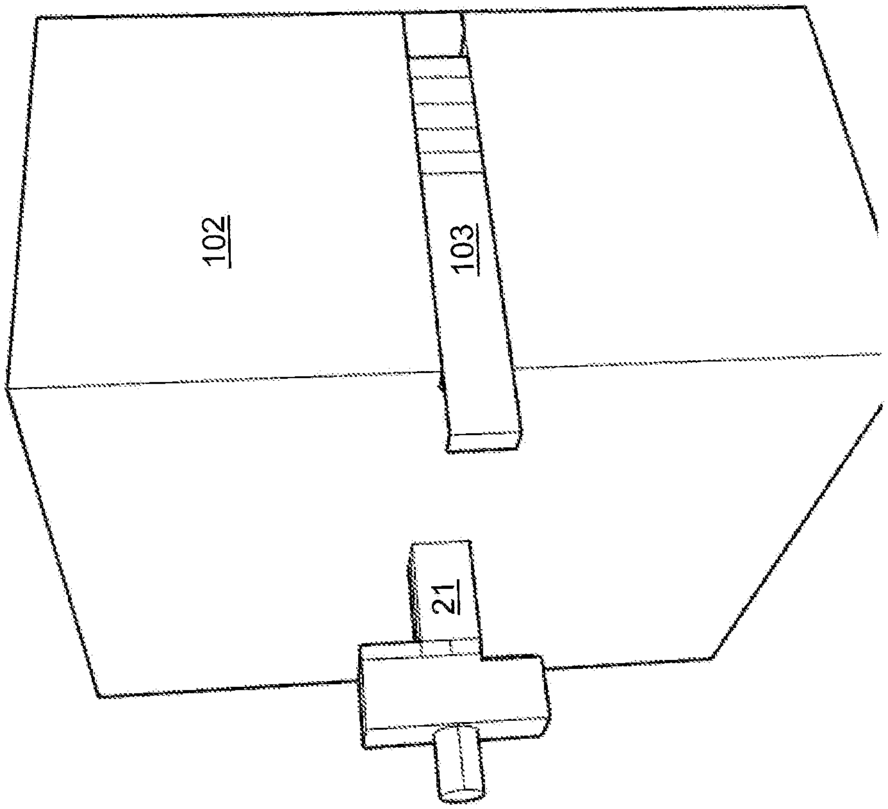
FIG. 14A illustrates an exemplary power outlet module.

FIG. 14A illustrates an exemplary power outlet module 102 including a stem 21 as described above. The power outlet module 102 may also include a locking mechanism 103 different from and/or in addition to the locking arms 27, 28.

Figure 14B:
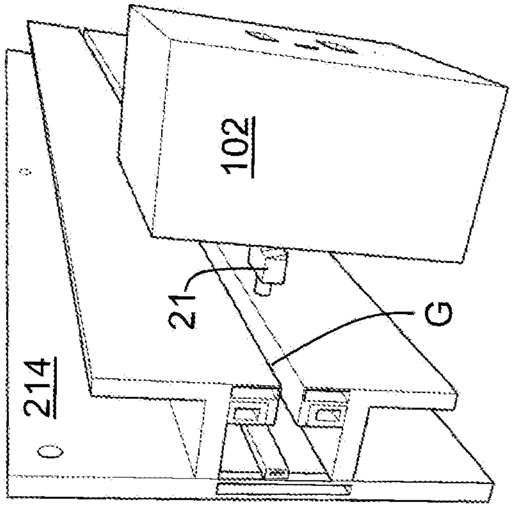
FIGS. 14B-14E illustrate installation of the power outlet module.
Figure 14C:
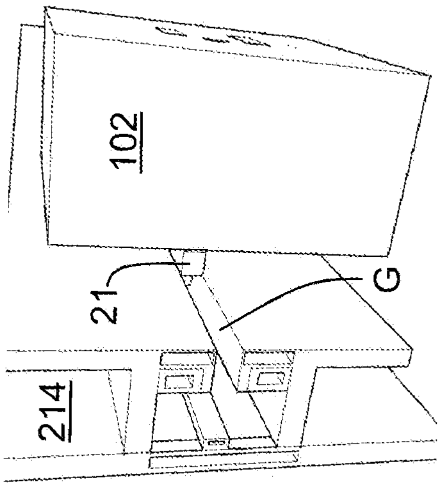
Figure 14D:
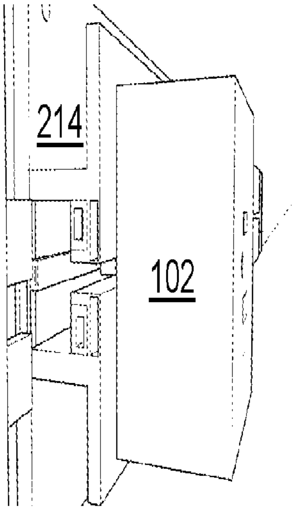
Figure 14E:
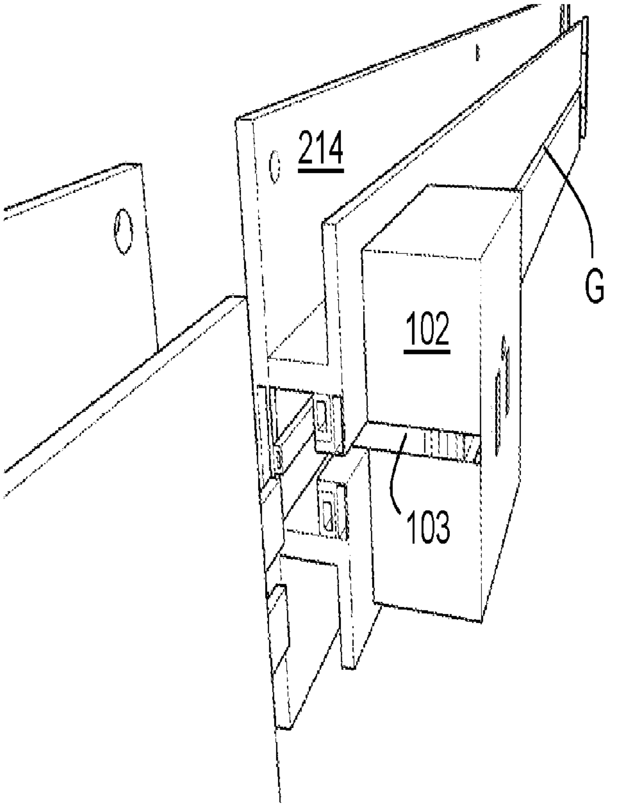

FIGS. 14B-14E illustrate installation of the power outlet module 102. FIG. 14B illustrates the module 102 in the inserting position while in FIG. 14C the stem 21 has been inserted in the track 210. FIG. 14D illustrates the module 102 inserted in the track 210 in the unlocked position. FIG.

14E illustrates the module 102 inserted in the track 210 in the locked or connected position.

First, a user may insert the stem 21 in the orientation shown in FIGS. 14A and 14B into the groove or opening G. The user may choose any location along the track 110 or 210 to install the power outlet module 102. The user may then rotate the power outlet module 102 for the incline surfaces 25*a*, 26*a* of the electrodes 25, 26 of the stem 21 to engage the electrodes 16, 17 of the track 110 or 210. Simultaneous pressure of the incline surfaces 25*a*, 26*a* against the electrodes 16, 17 mechanically creates a locking, spring-like, effect of the power outlet module to the track 110 or 210. This simultaneous pressure also provides adequate electrical connection between the electrodes 25, 26 and the electrodes 16, 17. Finally the locking mechanism 103 slides forward to engage the groove G of the 110 or 210. Engagement of the locking mechanism 103 to the groove G prevents rotation of the power outlet module 102. In one embodiment, the locking mechanism 103 is spring loaded to make engagement easier.

Removal or reinstallation of a power outlet module 102 is just as convenient. The user may disengage the locking mechanism 103 from the groove G to allow rotation of the power outlet module 102. The user may then rotate the power outlet module 102 in the opposite direction to disengage the incline surfaces 25*a*, 26*a* of the electrodes 25, 26 from the electrodes 16, 17 of the track 110 or 210. The user may then simply remove the power outlet module 102 from the track 110 or 210 or slide the power outlet module 102 to any desired position along the track 110 or 210 for installation at that new position.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

As used herein, an "operable connection" or "operable coupling," or a connection by which entities are "operably connected" or "operably coupled" is one in which the entities are connected in such a way that the entities may perform as intended. An operable connection may be a direct connection or an indirect connection in which an intermediate entity or entities cooperate or otherwise are part of the connection or are in between the operably connected entities. In the context of signals, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2*d*. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A mounting assembly for mechanical and electrical engagement of a powered module to a junction box, the mounting assembly comprising:

a stem having a base operably coupled to the powered module and a distal end distal the base;

a first electrode arm extending perpendicularly from a first side of the stem and having formed thereon a first electrode disposed on the first electrode arm to form a first incline surface; and a first locking arm extending perpendicularly from the first side of the stem and having formed thereon a first decline surface, a plane of the first incline surface intersects a plane of the first decline surface.

2. The mounting assembly of claim 1, comprising:

a ground contact disposed at the distal end.

3. The mounting assembly of claim 1, comprising:

a ground electrode elastically connected to the distal end.

4. The mounting assembly of claim 1, comprising:

a ground electrode; and a spring disposed between the ground electrode and the distal end.

5. The mounting assembly of claim 1, comprising:

a second electrode arm extending perpendicularly from a second side of the stem opposite the first side of the stem and having formed thereon a second electrode disposed on the second electrode arm to form a second incline surface; and a second locking arm extending perpendicularly from the second side of the stem and having formed thereon a second decline surface, a plane of the second incline surface intersects a plane of the second decline surface.

6. The mounting assembly of claim 5, comprising:

a first electrical terminal and a second electrical terminal disposed adjacent the base or remote from the stem;

a first electrical connection that electrically connects the first electrode to the first electrical terminal; and a second electrical connection that electrically connects the second electrode to the second electrical terminal.

7. The mounting assembly of claim 5, comprising:

a first electrical terminal, a second electrical terminal, and a ground electrical terminal disposed adjacent the base or remote from the stem;

a first electrical connection that electrically connects the first electrode to the first electrical terminal;

a second electrical connection that electrically connects the second electrode to the second electrical terminal; and a ground electrical connection that electrically connects the ground electrode to the ground electrical terminal.

8. A removable electrical power outlet module, comprising:

the mounting assembly of claim 1; and a standard AC mains power socket having a first contact electrically connected to the first electrode.

9. The removable electrical power outlet module of claim 8, comprising:

a second electrode arm extending perpendicularly from a second side of the stem opposite the first side of the stem and having formed thereon a second electrode disposed on the second electrode arm to form a second incline surface;

a second locking arm extending perpendicularly from the second side of the stem and having formed thereon a second decline surface, a plane of the second incline surface intersects a plane of the second decline surface; and a second contact of the standard AC mains power socket electrically connected to the second electrode.

10. The removable electrical power outlet module of claim 8, comprising:

a stem ground contact or electrode disposed at the distal end;

a socket ground contact of the standard AC mains power socket electrically connected to the stem ground contact or electrode.

11. A mounting assembly for mechanical and electrical engagement of a powered module to a junction box, the mounting assembly comprising:

an upper rail;

a first rail disposed parallel the upper rail and having disposed on a top surface thereof a first electrode;

a second rail disposed parallel the upper rail but separated from the first rail to produce a groove between a groove side of the first rail and a groove side of the second rail, the groove intersecting a central vertical axis of the mounting assembly, the second rail having disposed on a top surface thereon a second electrode;

a first wall connecting a first side of the upper rail to a connected side of the first rail opposite the groove side of the first rail;

a second wall connecting a second side of the upper rail to a connected side of the second rail opposite the groove side of the first rail;

at least one flange operably connected to the first wall or the second wall and extending radially away from the central vertical axis, the at least one flange having formed thereon mounting holes for mounting the mounting assembly to the junction box such that when the mounting assembly is mounted to the junction box at least one of the upper rail, the first rail, or the second rail is disposed inside the junction box.

12. The mounting assembly of claim 11, comprising:

a first electrical terminal configured to receive a first electrical wire and operably connected to the first electrode; and a second electrical terminal configured to receive a second electrical wire and operably connected to the second electrode.

13. The mounting assembly of claim 11, comprising:

a ground electrode disposed on a bottom surface of the upper rail.

14. The mounting assembly of claim 11, comprising:

a ground electrode disposed on a bottom surface of the upper rail; and a ground electrical terminal configured to receive a ground electrical wire and operably connected to the ground electrode.

15. A mounting assembly for mechanical and electrical engagement of a powered module, the mounting assembly comprising:

an upper rail;

a first rail disposed parallel the upper rail and having disposed on a top surface thereof a first electrode;

a second rail disposed parallel the upper rail but separated from the first rail to form a groove between a groove side of the first rail and a groove side of the second rail, the second rail having disposed on a top surface thereon a second electrode;

a first wall connecting a first side of the upper rail to a connected side of the first rail opposite the groove side of the first rail; and a second wall connecting a second side of the upper rail to a connected side of the second rail opposite the groove side of the first rail, and one or more of:

at least one flange operably connected to the first wall or the second wall, the at least one flange having formed thereon mounting holes for mounting the mounting assembly to a junction box such that when the mounting assembly is mounted to the junction box at least one of the upper rail, the first rail, or the second rail is disposed inside the junction box, or at least one wall panel receiving groove for receiving edges of a wall to which the mounting assembly is mounted.

16. The mounting assembly of claim 15, comprising:

a first electrical terminal configured to receive a first electrical wire and operably connected to the first electrode; and a second electrical terminal configured to receive a second electrical wire and operably connected to the second electrode.

17. The mounting assembly of claim 15, comprising:

a ground electrode disposed on a bottom surface of the upper rail.

18. The mounting assembly of claim 15, comprising:

a ground electrode disposed on a bottom surface of the upper rail; and a ground electrical terminal configured to receive a ground electrical wire and operably connected to the ground electrode.

* * * * *